United States Patent
Fujita et al.

(10) Patent No.: US 10,128,713 B2
(45) Date of Patent: Nov. 13, 2018

(54) ARMATURE WINDING OF ROTATING ELECTRICAL MACHINE

(71) Applicant: Kabushiki Kaisha Toshiba, Minato-ku (JP)

(72) Inventors: Masafumi Fujita, Yokohama (JP); Takashi Ueda, Yokohama (JP); Tadashi Tokumasu, Tokyo (JP); Kazuma Tsujikawa, Kawasaki (JP); Masanori Arata, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 227 days.

(21) Appl. No.: 15/270,661

(22) Filed: Sep. 20, 2016

(65) Prior Publication Data
US 2017/0093241 A1 Mar. 30, 2017

(30) Foreign Application Priority Data
Sep. 25, 2015 (JP) .................. 2015-188564

(51) Int. Cl.
*H02K 1/00* (2006.01)
*H02K 3/28* (2006.01)
*H02K 1/16* (2006.01)
*H02K 3/12* (2006.01)

(52) U.S. Cl.
CPC ................ *H02K 3/28* (2013.01); *H02K 1/16* (2013.01); *H02K 3/12* (2013.01); *H02K 2213/03* (2013.01)

(58) Field of Classification Search
CPC .. H02K 3/28; H02K 1/16; H02K 3/12; H02K 2213/03
USPC ........................................... 310/198
See application file for complete search history.

(56) References Cited

U.S. PATENT DOCUMENTS

| | | | |
|---|---|---|---|
| 2,778,963 A | 6/1955 | Hobermann | |
| 2,778,962 A * | 1/1957 | Taylor | H02K 3/28 310/198 |
| 3,408,517 A | 10/1968 | Willyoung | |

(Continued)

FOREIGN PATENT DOCUMENTS

| | | |
|---|---|---|
| CN | 102326321 A | 1/2012 |
| EP | 2 421 124 A1 | 2/2012 |

(Continued)

OTHER PUBLICATIONS

Extended European Search Report dated Mar. 2, 2017 in Patent Application No. 16189615.4.

*Primary Examiner* — Jianchun Qin
(74) *Attorney, Agent, or Firm* — Oblon, McClelland, Maier & Neustadt, L.L.P.

(57) ABSTRACT

According to one embodiment, there is provided a 3-phase even-numbered-pole 2-layered armature winding housed in 45 slots per pole provided in a laminated iron core. In each coil piece group of each phase belt, the coil pieces of the second and fifth parallel circuits are placed in the second positions from the pole center among three positions of coil pieces in corresponding coil piece group. In six or four groups out of ten coil piece groups of each phase belt, coil pieces of the first or fourth parallel circuit are placed in the first position from the pole center. In first and second coil piece groups, coil pieces of the first or fourth parallel circuit are placed in different-numbered positions from the pole center.

14 Claims, 14 Drawing Sheets

(56) References Cited

U.S. PATENT DOCUMENTS

| | | | | |
|---|---|---|---|---|
| 3,660,705 | A * | 5/1972 | Willyoung | H02K 3/28 310/198 |
| 8,536,755 | B2 * | 9/2013 | Tokumasu | H02K 3/12 310/195 |
| 2012/0025659 | A1 | 2/2012 | Tokumasu et al. | |
| 2013/0334924 | A1 | 12/2013 | Tokumasu et al. | |
| 2014/0252907 | A1 | 9/2014 | Tokumasu et al. | |
| 2015/0162795 | A1 | 6/2015 | Tokumasu et al. | |
| 2015/0333587 | A1 | 11/2015 | Tokumasu et al. | |
| 2016/0149455 | A1 | 5/2016 | Tokumasu et al. | |
| 2016/0322878 | A1 | 11/2016 | Tokumasu et al. | |

FOREIGN PATENT DOCUMENTS

| | | |
|---|---|---|
| GB | 874311 A | 8/1961 |
| JP | 2001-309597 A | 11/2001 |
| JP | 5367436 | 12/2013 |

* cited by examiner

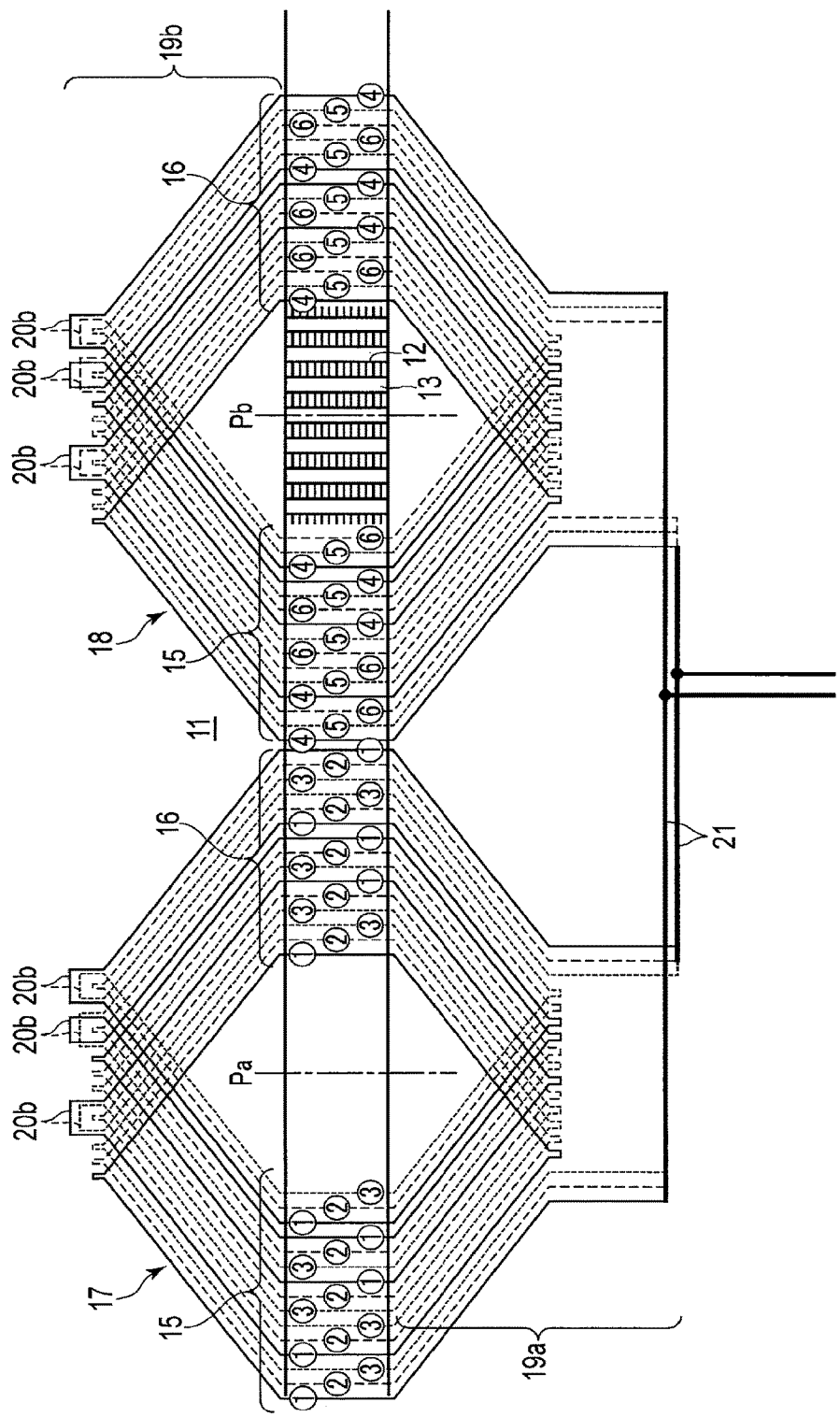
F I G. 6

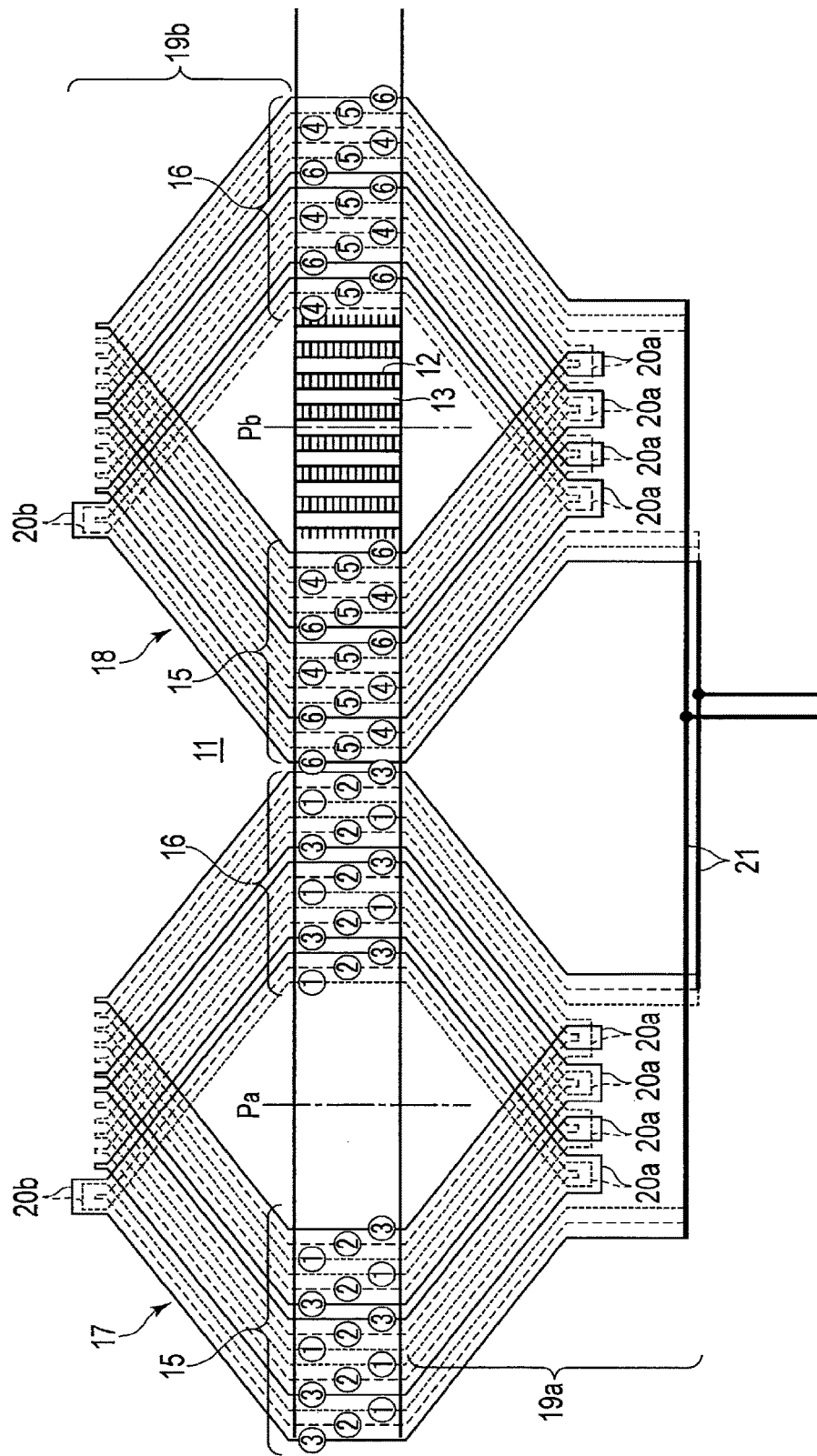
F I G. 12

ARMATURE WINDING OF ROTATING ELECTRICAL MACHINE

CROSS-REFERENCE TO RELATED APPLICATIONS

This application is based upon and claims the benefit of priority from Japanese Patent Application No. 2015-188564, filed Sep. 25, 2015, the entire contents of which are incorporated herein by reference.

FIELD

Embodiments described herein relate generally to an armature winding having six parallel circuits applied to a 3-phase rotating electrical machine having 45 slots per pole.

BACKGROUND

In a large-capacity rotating electrical machine, an armature winding is provided with upper and lower coil pieces arranged in slots of a laminated iron core in a two-layer structure, and parallel circuits are connected in series, thereby increasing the generated voltage and machine capacity. However, as a voltage of an armature winding is increased, the thickness of the main insulation of an armature winding is increased to withstand such higher voltage. As a result, a cross-sectional area of a conducting portion is reduced, and a current density increases, so that a loss increases.

Particularly, in an indirect cooling type machine in which the armature winding is cooled from an outer side of the main insulation, as the thickness of the main insulation increases, a thermal resistance increases, and a temperature disadvantageously increases in the armature winding. For this reason, an armature winding is divided into multiple parallel circuits, thereby decreasing the voltage of the armature winding and the thickness of the main insulation, reducing the loss, and increasing the cooling capacity, while maintaining the machine capacity. Further, in an indirect cooling type large-capacity machine, it is common to increase the number of slots in the armature winding to increase a cooling cycle of the armature winding. Therefore, an armature winding having three or more parallel circuits is desirable.

If the armature winding having three or more parallel circuits is applied to a 2-pole machine, the voltages generated by each of the parallel circuits are not completely equated, and an eddy current is generated between the parallel circuits, and a loss in the armature winding increases disadvantageously.

In order to reduce such a loss cause by the circulation current, it is necessary to minimize imbalance between the voltages generated by the parallel circuits. For this purpose, a special consideration is required in placement of coils of each parallel circuit in each phase belt.

An example of improvement in the placement of coils will be described with reference to FIG. 13, which is a developed perspective view illustrating a part of an armature winding for one phase.

FIG. 13 illustrates an example of an armature winding having four parallel circuits applicable to a 3-phase 2-pole 72-slot rotating electrical machine as discussed in the U.S. Pat. No. 2,778,962 (hereinafter, referred to as "Taylor's patent").

Although FIG. 13 illustrates a part of an armature winding for only one phase, it is obvious that the same configuration as that of FIG. 13 may be similarly applied to the other two phases shifted by 120° and 240°.

In Taylor's patent, assuming that the parallel circuits are numbered "1 to 4," twelve parallel circuits of upper and lower coil pieces 15 and 16 of a first phase belt 17 are numbered "122121121221" sequentially from a pole center. Similarly, parallel circuits of upper and lower coil pieces 15 and 16 of a second phase belt 18 are numbered "344343343443" sequentially from the pole center. This decreases a deviation of voltage (an absolute value of a deviation from an average phase voltage) and a deviation of phase difference (a deviation of phase angle from an average phase voltage) of each parallel circuit.

To realize such a connection, in FIG. 13, fourteen jumper wires 20a per phase are provided in a connection side coil end 19a.

Meanwhile, a technique for reducing deviations in the voltage and the phase angle between each parallel circuit is discussed in U.S. Pat. No. 2,778,963 (hereinafter, referred to as "Habermann's patent").

In Habermann's patent, a voltage deviation between each parallel circuit is rated at 0.4% or smaller, and a phase angle deviation is rated at 0.15° or smaller. However, in Taylor's patent, the voltage deviation is rated at 0.12%, and the phase angle deviation is rated at 0°. It is conceived that these values are highly balanced and sufficiently efficient to decrease an eddy current under the same condition.

The connection method of Taylor's patent described above provides an armature winding having four parallel circuits applicable to a 3-phase 2-pole 72-slot rotating electrical machine. However, in an indirect cooling type large-capacity rotating electrical machine, it is necessary for the armature winding to have a greater number of parallel circuits. In this regard, as illustrated in FIG. 14, a connection method for an armature winding of a 2-pole 72-slot rotating electrical machine having six parallel circuits is known in the art. However, although this connection method provides an armature winding having six parallel circuits applicable to a 3-phase 2-pole 72-slot rotating electrical machine, its application is limited only to the 3-phase 2-pole 72-slot rotating electrical machine.

In the future, it is anticipated that a novel large-capacity technology is employed in the indirect cooling type large-capacity rotating electrical machine, and this may increase the number of windings to obtain a satisfactory generation voltage. For this purpose, it is desired to implement an armature winding having a greater number of slots. For example, it is desired to implement an armature winding of a rotating electrical machine having six parallel circuits applied to a 3-phase rotating electrical machine having 45 slots per pole.

BRIEF DESCRIPTION OF THE DRAWINGS

FIG. 6 is a developed perspective view illustrating a part of an armature winding of a rotating electrical machine for two poles/one phase according to a sixth embodiment;

FIG. 12 is a developed perspective view illustrating a part of an armature winding of a rotating electrical machine for two poles/one phase according to a twelfth embodiment;

DETAILED DESCRIPTION

Embodiments will now be described with reference to the accompanying drawings.

In general, according to one embodiment, there is provided a 3-phase even-numbered-pole 2-layered armature winding housed in 45 slots per pole provided in a laminated iron core of a rotating electrical machine, comprising: six parallel circuits provided for each phase of the winding and divided into a pair of phase belts including first and second phase belts, each parallel circuit including upper and lower coil pieces which are connected to each other in series in a connection side coil end and a counter-connection side coil end, wherein, when relative positions of each of the upper and lower coil pieces in one phase belt are numbered sequentially from a pole center, each of the upper and lower coil pieces are classified into five coil piece groups placed in first to third positions, fourth to sixth positions, seventh to ninth position, tenth to twelfth position, and thirteenth to fifteenth positions from the pole center, three coil pieces of first, second, and third parallel circuits are arranged in each coil piece group of the first phase belt, and three coil pieces of fourth, fifth, and sixth parallel circuits are arranged in each coil piece group of the second phase belt, in each coil piece group of each phase belt, the coil pieces of the second and fifth parallel circuits are placed in the second positions from the pole center among three positions of coil pieces in corresponding coil piece group, in six or four groups out of ten coil piece groups of each phase belt, coil pieces of the first or fourth parallel circuit are placed in the first position from the pole center among three positions of coil pieces in corresponding coil piece group, and in first and second coil piece groups placed in the first and second positions from the pole center out of coil piece groups of each phase belt, coil pieces of the first or fourth parallel circuit are placed in different-numbered positions from the pole center to be differently between the first and second coil piece groups.

First Embodiment

First, a first embodiment will be described with reference to FIG. 1.

Figure 1:
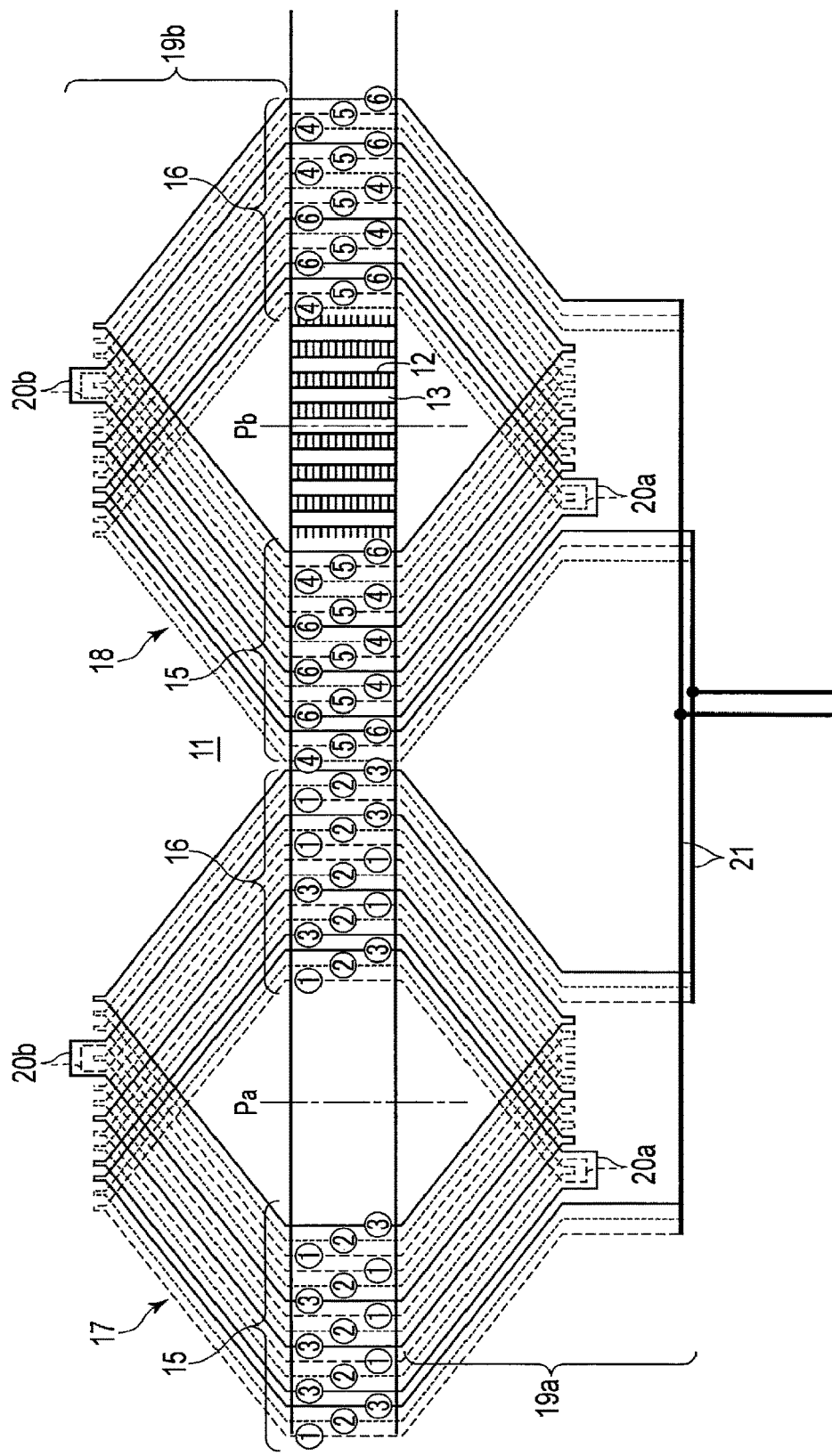
FIG. 1 is a developed perspective view illustrating a part of an armature winding of a rotating electrical machine for two poles/one phase according to a first embodiment.

FIG. 1 is a developed perspective view illustrating a part of an armature winding of a rotating electrical machine for two poles/one phase according to a first embodiment.

An armature 11 of the rotating electrical machine of FIG. 1 has a 3-phase even-numbered-pole 2-layered armature winding. In the example of FIG. 1, a laminated armature core 12 is provided with forty five slots 13 per pole. The 2-pole 3-phase armature winding that forms six parallel circuits is housed in the slots 13 in a two-layer structure. In the case of a 3-phase 2-pole rotating electrical machine (2-pole machine), the total number of slots is "90."

The armature winding of each phase has upper coil pieces 15 housed in the upper part of the slot 13 and lower coil pieces 16 housed in the lower part of the slot 13. The ends of the upper and lower coil pieces 15 and 16 are connected in series at a connection side coil end 19a connected to a lead-out portion of the winding, and at a counter-connection side coil end 19b located axially opposite to the connection side coil end 19a and not connected to the lead-out portion of the winding. Further, the armature winding has a first phase belt 17 in which the upper and lower coil pieces 15 and 16 are housed in the fifteen slots 13 provided in the armature core 12, and a second phase belt 18 in which the upper and lower coil pieces 15 and 16 are housed in the fifteen slots 13.

Here, each of the first and second phase belts refers to a group of coils assigned with the same phase by dividing each of 3-phases into two parts and housing the upper and lower coil pieces in 45 slots per pole of the laminated iron core (armature core) in a two-layer structure and sequentially connecting them in series.

The armature winding of each phase has six parallel circuits. The parallel circuits are given circled numbers 1, 2, 3, 4, 5, and 6 for identification in the drawings. Note that the circuit numbers are assigned to identify the parallel circuits for convenience of explanation, and may be given any symbol in any order.

In each phase belt 17 and 18, the upper coil piece 15 is connected to the corresponding lower coil piece 16 in the connection side coil end 19a and the counter-connection side coil end 19b apart by a predetermined coil pitch to form six parallel circuits. The parallel circuits are connected in parallel through the lead-out connection conductor 21 provided in the connection side coil end 19a to form an armature winding. In FIG. 1, the coil pitch is set to a small value of "2/3" by way of example. This coil pitch is just for easy understanding, and may be set to any other value without limitation.

As illustrated in FIG. 1, four jumper wires 20a per phase are provided in the connection side coil ends 19a of the phase belts 17 and 18, and four jumper wires 20b per phase are provided in the counter-connection side coil ends 19b. In addition, in the first phase belt 17, the circuits of the upper coil pieces 15 are numbered "3, 2, 1, 1, 2, 3, 1, 2, 3, 1, 2, 3, 3, 2, 1" sequentially from the pole center, and the circuits of the lower coil pieces 16 are numbered "1, 2, 3, 3, 2, 1, 3, 2, 1, 1, 2, 3, 1, 2, 3" sequentially from the pole center. In the second phase belt 18, the circuits of the upper coil pieces 15 are numbered "6, 5, 4, 4, 5, 6, 4, 5, 6, 4, 5, 6, 6, 5, 4" sequentially from the pole center, and the circuits of the lower coil pieces 16 are numbered "4, 5, 6, 6, 5, 4, 6, 5, 4, 4, 5, 6, 4, 5, 6" sequentially from the pole center.

As a result, when relative positions of the upper and lower coil pieces 15 and 16 in each phase belt are expressed by positions from the pole center, the upper and lower coil pieces 15 and 16 of each parallel circuit are placed as shown in Table 1.

TABLE 1

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | | | 1 | 1 | | | 1 | |
| | Lower coil piece | 1 | | | | | 1 | | |
| Parallel circuits 2, 5 | Upper coil piece | | 1 | | | 1 | | | 1 |
| | Lower coil piece | | 1 | | | 1 | | | 1 |
| Parallel circuits 3, 6 | Upper coil piece | 1 | | | | 1 | | | |
| | Lower coil piece | | | 1 | 1 | | | 1 | |

| Relative positions from pole center | | 9 | 10 | 11 | 12 | 13 | 14 | 15 |
|---|---|---|---|---|---|---|---|---|
| Parallel circuits 1, 4 | Upper coil piece | | 1 | | | | 1 | |
| | Lower coil piece | 1 | 1 | | 1 | | | |
| Parallel circuits 2, 5 | Upper coil piece | | | 1 | | 1 | | |
| | Lower coil piece | | | 1 | | 1 | | |
| Parallel circuits 3, 6 | Upper coil piece | 1 | | | 1 | 1 | | |
| | Lower coil piece | | | | 1 | | | 1 |

As shown in Table 1, for the first and fourth parallel circuits, five upper coil pieces 15 are placed in the 3rd, 4th, 7th, 10th, and 15th positions from the pole center, and five lower coil pieces 16 are placed in the 1st, 6th, 9th, 10th, and 13th positions from the pole center. For each of the second and fifth parallel circuits, five upper and lower coil pieces 15 and 16 are placed in the 2nd, 5th, 8th, 11th, and 14th positions from the pole center. For the third and sixth parallel circuits, five upper coil pieces 15 are placed in the 1st, 6th, 9th, 12th, and 13th positions from the pole center, and five lower coil pieces 16 are placed in the 3rd, 4th, 7th, 12th, and 15th positions from the pole center.

Next, imbalance of the voltage generated in one phase will be described. Here, the following definition is generally employed as a means for numerically evaluating the degree of imbalance. Specifically, the voltage expressed by p.u. of only one of the multiple parallel circuits in one phase refers to a ratio between an open-circuit voltage of the corresponding parallel circuit and an average voltage (phase voltage) in the entire phase, and indicates a degree of imbalance in the voltage between the corresponding parallel circuit and the entire phase. Similarly, a phase angle deviation between the open-circuit voltage generated in one parallel circuit and the phase voltage indicates a degree of imbalance in the phase angle of the voltage between the corresponding parallel circuit and the entire phase.

Table 2 shows the degree of balance in the voltage generated from the armature winding according to the first embodiment. However, in the first embodiment, the degree of balance varies depending on the coil pitch. Therefore, in Table 2, the coil pitch is set to "37/45 (82.22%)." As shown in Table 2, in the armature winding according to the first embodiment, a voltage deviation (a deviation of a p.u. voltage from 1.0) is 0.19% at most, and a phase angle deviation is 0.08°. From Table 2, it is recognized that the armature winding according to the first embodiment satisfies the balance requirement of Habermann's patent, in which the voltage deviation be set to 0.4% or smaller and the phase angle deviation be set to 0.15° or smaller.

TABLE 2

| Parallel circuit | 1 | 2 | 3 |
|---|---|---|---|
| Voltage [p.u.] | 0.9981 | 1.0016 | 1.0002 |
| Voltage phase [°] | 0.0767 | 0.0000 | −0.0765 |
| Parallel circuit | 4 | 5 | 6 |
| Voltage [p.u.] | 0.9981 | 1.0016 | 1.0002 |
| Voltage phase [°] | 0.0767 | 0.0000 | −0.0765 |

Table 3 shows a change in the maximum values of the voltage deviation and the phase angle deviation depending on a coil pitch according to the first embodiment. When the coil pitch is within a range of 34/45 to 44/45, the degree of balance satisfies the balance requirement of Habermann's patent, in which the voltage deviation be "0.4%" or smaller and the phase angle deviation be "0.15°" or smaller.

TABLE 3

| Coil pitch | 33/45 | 34/45 | 35/45 | 36/45 | 37/45 | 38/45 |
|---|---|---|---|---|---|---|
| Voltage Deviation[%] | 0.4137 | 0.3548 | 0.2976 | 0.2418 | 0.1872 | 0.1627 |
| Phase angle Deviation[°] | 0.0492 | 0.0563 | 0.0633 | 0.0701 | 0.0767 | 0.0831 |
| Coil pitch | 39/45 | 40/45 | 41/45 | 42/45 | 43/45 | 44/45 |
| Voltage Deviation[%] | 0.1627 | 0.1627 | 0.1841 | 0.2347 | 0.2849 | 0.3349 |
| Phase angle Deviation[°] | 0.0895 | 0.0959 | 0.1022 | 0.1084 | 0.1146 | 0.1207 |

As described above, according to the first embodiment, it is possible to realize the degree of balance satisfying the requirement of Habermann's patent regarding the voltages of the parallel circuits and reduce an eddy current.

Figure 13:
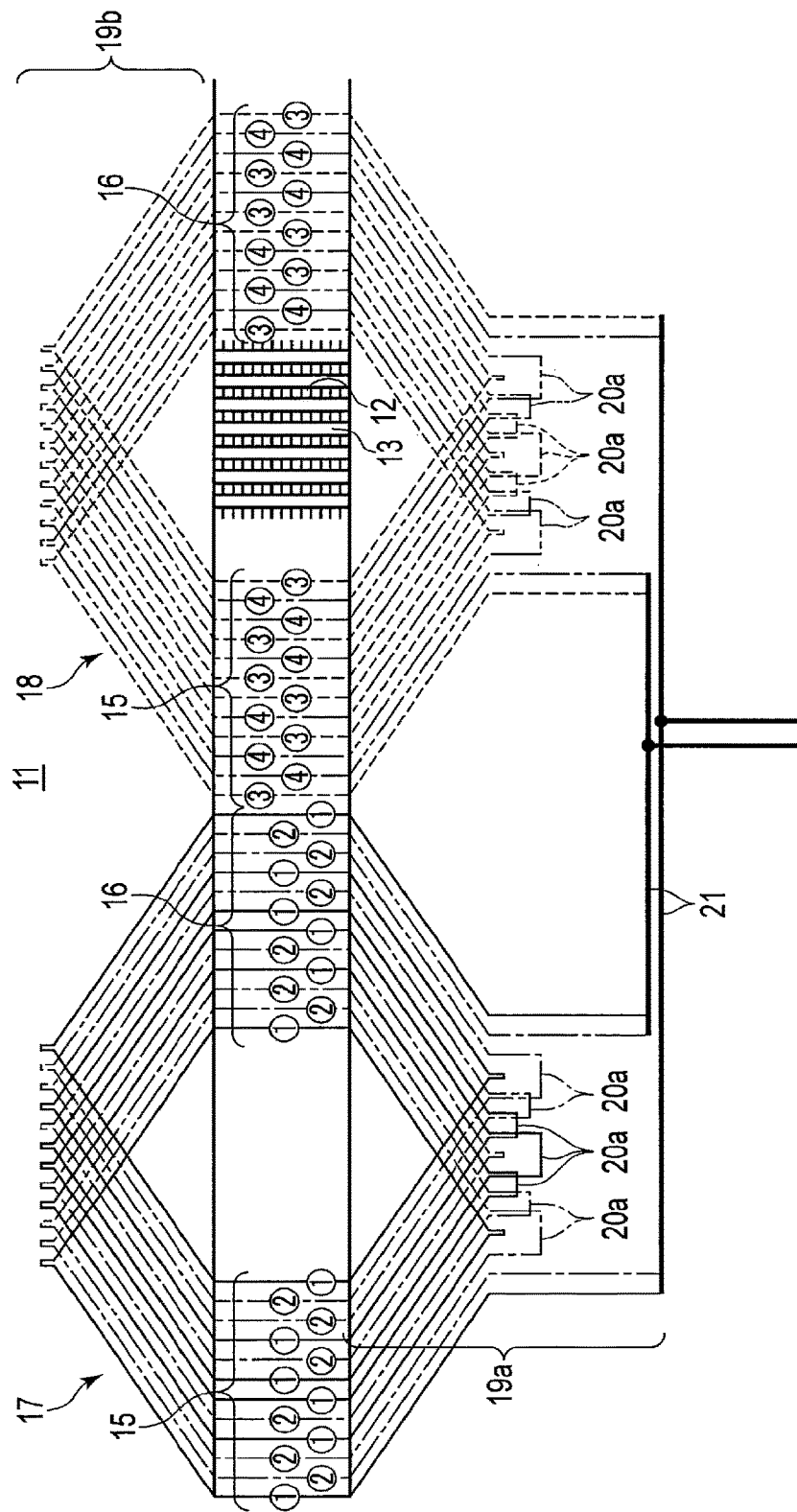
FIG. 13 is a developed perspective view, illustrating a part of an armature winding of a rotating electrical machine for two poles/one phase according to prior art.
Figure 14:
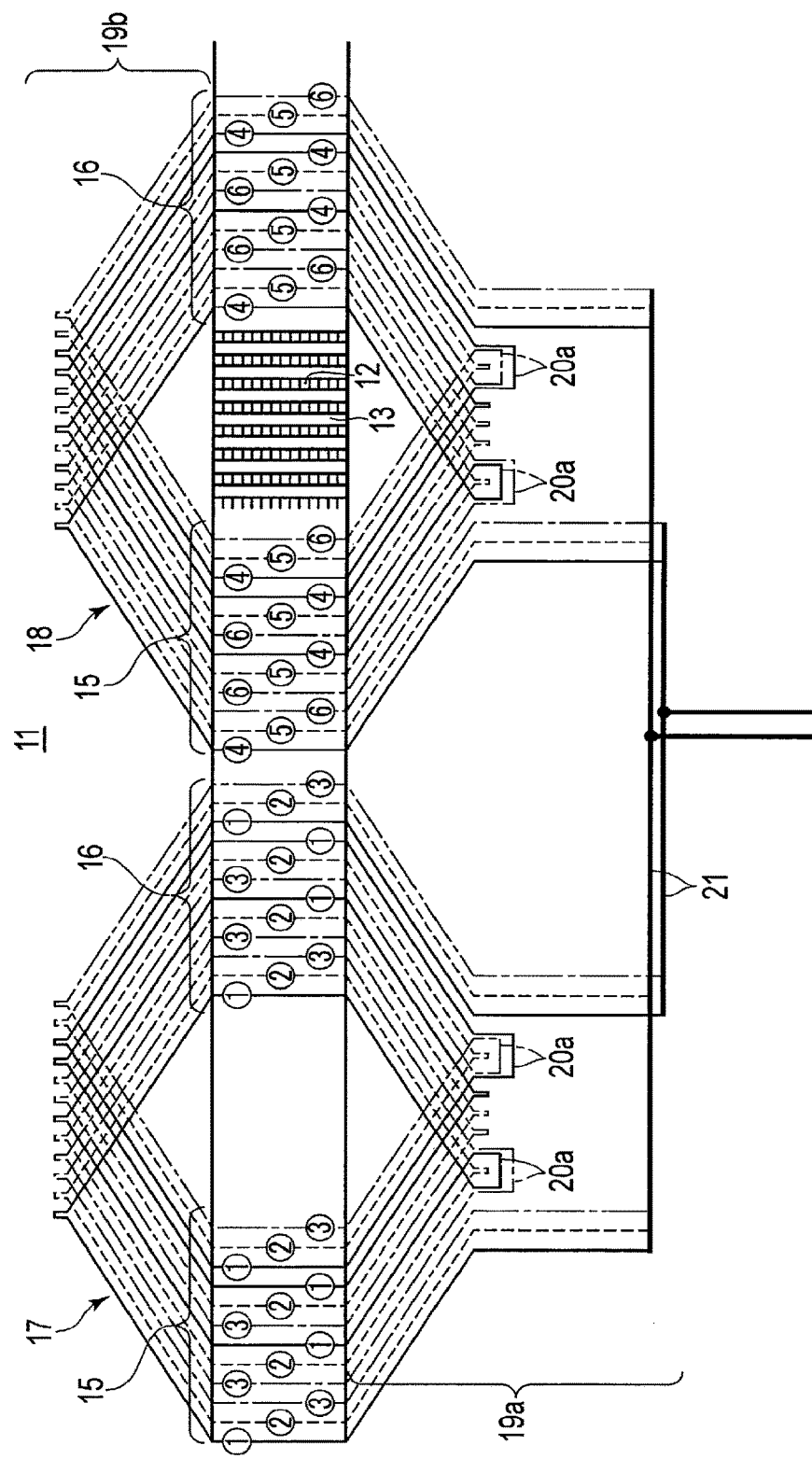
FIG. 14 is a developed perspective view illustrating a part of an armature winding of a rotating electrical machine for two poles/one phase according to prior art.

According to the first embodiment, a total of eight jumper wires 20a are provided per phase. In contrast, fourteen jumper wires per phase are provided in the armature winding of FIG. 13. Therefore, it is recognized that the number of jumper wires 20a is smaller in the armature winding according to the first embodiment. In addition, according to the first embodiment, four jumper wires 20a per phase are provided in each of the connection side coil ends 19a and the counter-connection side coil ends 19b. In contrast, eight jumper wires per phase are provided in the armature winding of FIG. 14 for one-side coil ends. Therefore, it is recognized that the number of jumper wires is smaller in the armature winding according to the first embodiment. As a result, it is possible to increase a distance between the jumper wires 20a, improve workability for connecting the jumper wires 20a, easily obtain an insulation quality and a fixing strength in a connecting point, and provide a more reliable armature winding.

Note that the embodiment is not limited to the configuration described above. For example, the lead-out positions may be set differently from those described above, or the coil pieces located in electrically equivalent positions may be exchanged between the parallel circuits 1 and 4.

Second Embodiment

Next, a second embodiment will be described with reference to FIG. 2. Here, the parts common to those of the first embodiment described above (FIG. 1) will not be repeatedly described, and the description will focus on the different parts.

Figure 2:
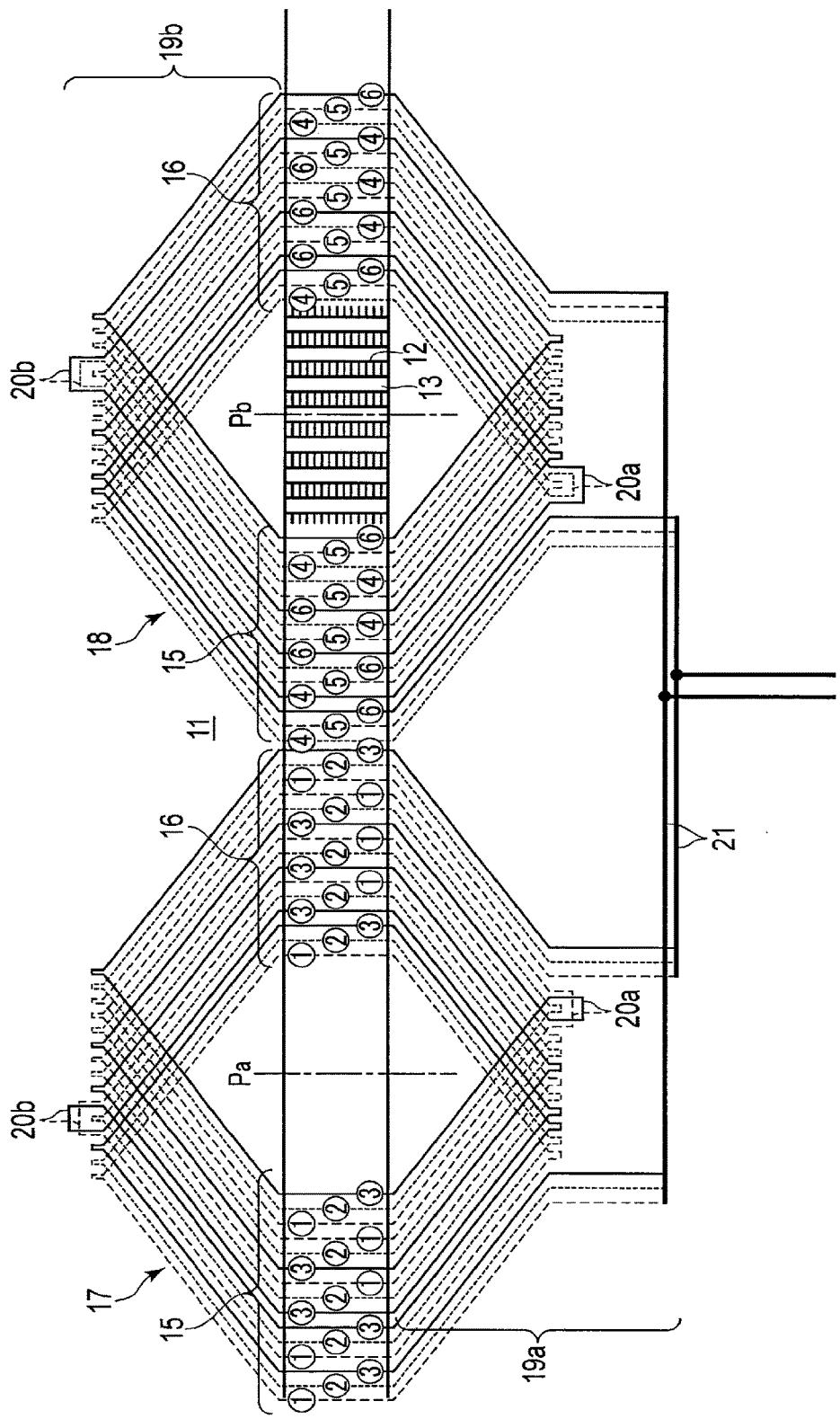
FIG. 2 is a developed perspective view illustrating a part of an armature winding of a rotating electrical machine for two poles/one phase according to a second embodiment.

FIG. 2 is a developed perspective view illustrating a part of an armature winding of a rotating electrical machine for two poles/one phase according to a second embodiment.

As illustrated in FIG. 2, four jumper wires 20a per phase are provided in the connection side coil ends 19a of the phase belts 17 and 18, and four jumper wires 20b per phase are provided in the counter-connection side coil ends 19b. In addition, in the first phase belt 17, the circuits of the upper coil pieces 15 are numbered "3, 2, 1, 1, 2, 3, 1, 2, 3, 3, 2, 1, 3, 2, 1" sequentially from the pole center, and the circuits of the lower coil pieces 16 are numbered "1, 2, 3, 3, 2, 1, 3, 2, 1, 3, 2, 1, 1, 2, 3" sequentially from the pole center. In the second phase belt 18, the circuits of the upper coil pieces 15 are numbered "6, 5, 4, 4, 5, 6, 4, 5, 6, 6, 5, 4, 6, 5, 4" sequentially from the pole center, and the circuits of the lower coil pieces 16 are numbered "4, 5, 6, 6, 5, 4, 6, 5, 4, 6, 5, 4, 4, 5, 6" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 4.

TABLE 4

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | | | 1 | 1 | | | 1 | |
| | Lower coil piece | 1 | | | | | 1 | | |
| Parallel circuits 2, 5 | Upper coil piece | | 1 | | | 1 | | | 1 |
| | Lower coil piece | | 1 | | | 1 | | | 1 |
| Parallel circuits 3, 6 | Upper coil piece | 1 | | | | | 1 | | |
| | Lower coil piece | | | 1 | 1 | | | | |

| Relative positions from pole center | | 9 | 10 | 11 | 12 | 13 | 14 | 15 |
|---|---|---|---|---|---|---|---|---|
| Parallel circuits 1, 4 | Upper coil piece | | | | 1 | | | 1 |
| | Lower coil piece | 1 | | | 1 | 1 | | |
| Parallel circuits 2, 5 | Upper coil piece | | | 1 | | | 1 | |
| | Lower coil piece | | | 1 | | | 1 | |
| Parallel circuits 3, 6 | Upper coil piece | 1 | 1 | | 1 | | | |
| | Lower coil piece | | 1 | | | | | 1 |

As shown in Table 4, for the first and fourth parallel circuits, five upper coil pieces 15 are placed in the 3rd, 4th, 7th, 12th, and 15th positions from the pole center, and five lower coil pieces 16 are placed in the 1st, 6th, 9th, 12th, and 13th positions from the pole center. For each of the second and fifth parallel circuits, five upper and lower coil pieces 15 and 16 are placed in the 2nd, 5th, 8th, 11th, and 14th positions from the pole center. For the third and sixth parallel circuits, five upper coil pieces 15 are placed in the 1st, 6th, 9th, 10th, and 13th positions from the pole center, and five lower coil pieces 16 are placed in the 3rd, 4th, 7th, 10th, and 15th positions from the pole center.

Table 5 shows the degree of balance of the voltage generated from the armature winding according to the second embodiment. Meanwhile, according to the second embodiment, the degree of balance varies depending on a coil pitch. Therefore, in Table 5, the coil pitch is set to "37/45 (82.22%)." As shown in Table 5, in the armature winding according to the second embodiment, a voltage deviation (a deviation of a p.u. voltage from 1.0) is "0.19%" at most, and a phase angle deviation is "0.08°." It is recognized that these values satisfy the requirement of Habermann's patent, in which the voltage deviation be "0.4%" or smaller, and the phase angle deviation be "0.15°" or smaller.

TABLE 5

| Parallel circuit | 1 | 2 | 3 |
|---|---|---|---|
| Voltage [p.u.] | 0.9981 | 1.0016 | 1.0002 |
| Voltage phase [°] | −0.0767 | 0.0000 | 0.0765 |
| Parallel circuit | 4 | 5 | 6 |
| Voltage [p.u.] | 0.9992 | 1.0016 | 1.0002 |
| Voltage phase [°] | 0.0000 | 0.0000 | 0.0765 |

Table 6 shows a change of the maximum values of the voltage deviation and the phase angle deviation depending on a coil pitch according to the second embodiment. When the coil pitch is within a range of "34/45 to 44/45," the degree of balance satisfies the requirement of Habermann's patent, in which the voltage deviation be "0.4%" or smaller, and the phase angle deviation be "0.15°" or smaller.

TABLE 6

| Coil pitch | 33/45 | 34/45 | 35/45 | 36/45 | 37/45 | 38/45 |
|---|---|---|---|---|---|---|
| Voltage Deviation[%] | 0.4137 | 0.3548 | 0.2976 | 0.2418 | 0.1872 | 0.1627 |
| Phase angle Deviation[°] | 0.0492 | 0.0563 | 0.0633 | 0.0701 | 0.0767 | 0.0831 |
| Coil pitch | 39/45 | 40/45 | 41/45 | 42/45 | 43/45 | 44/45 |
| Voltage Deviation[%] | 0.1627 | 0.1627 | 0.1841 | 0.2347 | 0.2849 | 0.3349 |
| Phase angle Deviation[°] | 0.0895 | 0.0959 | 0.1022 | 0.1084 | 0.1146 | 0.1207 |

As described above, according to the second embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

Third Embodiment

Next, a third embodiment will be described with reference to FIG. 3. Here, the parts common to those of the first embodiment described above (FIG. 1) will not be repeatedly described, and the description will focus on the different parts.

Figure 3:
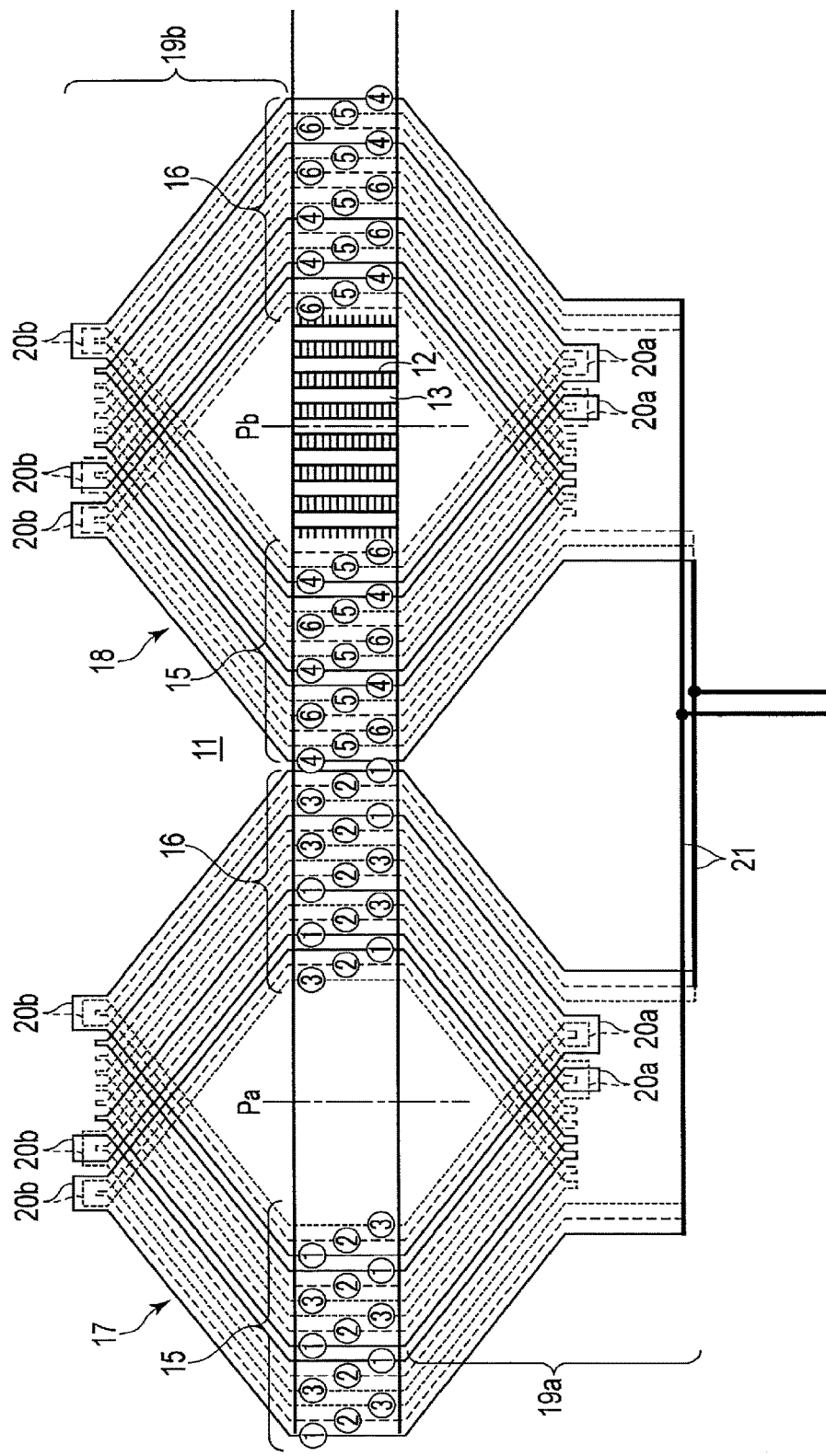
FIG. 3 is a developed perspective view illustrating a part of an armature winding of a rotating electrical machine for two poles/one phase according to a third embodiment.

FIG. 3 is a developed perspective view illustrating a part of an armature winding of a rotating electrical machine for two poles/one phase according to a third embodiment.

As illustrated in FIG. 3, eight jumper wires 20a per phase are provided in the connection side coil ends 19a of the phase belts 17 and 18, and twelve jumper wires 20b per phase are provided in the counter-connection side coil ends 19b. In addition, in the first phase belt 17, the circuits of the upper coil pieces 15 are numbered "3, 2, 1, 1, 2, 3, 3, 2, 1, 1, 2, 3, 3, 2, 1" sequentially from the pole center, and the circuits of the lower coil pieces 16 are numbered "3, 2, 1, 1, 2, 3, 1, 2, 3, 3, 2, 1, 3, 2, 1" sequentially from the pole center. In the second phase belt 18, the circuits of the upper coil pieces 15 are numbered "6, 5, 4, 4, 5, 6, 6, 5, 4, 4, 5, 6, 6, 5, 4" sequentially from the pole center, and the circuits of the lower coil pieces 16 are numbered "6, 5, 4, 4, 5, 6, 4, 5, 6, 6, 5, 4, 6, 5, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 7.

TABLE 7

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | | | 1 | 1 | | | | |
| | Lower coil piece | | | 1 | 1 | | | 1 | |
| Parallel circuits 2, 5 | Upper coil piece | 1 | | | | 1 | | | 1 |
| | Lower coil piece | 1 | | | 1 | | | | 1 |
| Parallel circuits 3, 6 | Upper coil piece | 1 | | | | | 1 | 1 | |
| | Lower coil piece | 1 | | | | | 1 | | |

| Relative positions from pole center | | 9 | 10 | 11 | 12 | 13 | 14 | 15 |
|---|---|---|---|---|---|---|---|---|
| Parallel circuits 1, 4 | Upper coil piece | 1 | 1 | | | | | 1 |
| | Lower coil piece | | | | 1 | | | 1 |
| Parallel circuits 2, 5 | Upper coil piece | | | 1 | | | 1 | |
| | Lower coil piece | | | 1 | | | 1 | |
| Parallel circuits 3, 6 | Upper coil piece | | | | 1 | 1 | | |
| | Lower coil piece | 1 | 1 | | | 1 | | |

As shown in Table 7, for the first and fourth parallel circuits, five upper coil pieces 15 are placed in the 3rd, 4th, 9th, 10th, and 15th positions from the pole center, and five lower coil pieces 16 are placed in the 3rd, 4th, 7th, 12th, and 15th positions from the pole center. For each of the second and fifth parallel circuits, five upper and lower coil pieces 15 and 16 are placed in the 2nd, 5th, 8th, 11th, and 14th positions from the pole center. For the third and sixth parallel circuits, five upper coil pieces 15 are placed in the 1st, 6th, 7th, 12th, and 13th positions from the pole center, and five lower coil pieces 16 are placed in the 1st, 6th, 9th, 10th, and 13th positions from the pole center.

Table 8 shows the degree of balance of the voltage generated from the armature winding according to the third embodiment. Meanwhile, according to the third embodiment, the degree of balance varies depending on a coil pitch. Therefore, in Table 8, the coil pitch is set to "37/45 (82.22%)." As shown in Table 8, in the armature winding according to the third embodiment, a voltage deviation (a deviation of a p.u. voltage from 1.0) is "0.16%" at most, and a phase angle deviation is "0.03°." It is recognized that these values satisfy the requirement of Habermann's patent, in which the voltage deviation be "0.4%" or smaller, and the phase angle deviation be "0.15°" or smaller.

TABLE 8

| Parallel circuit | 1 | 2 | 3 |
|---|---|---|---|
| Voltage [p.u.] | 0.9997 | 1.0016 | 0.9987 |
| Voltage phase [°] | 0.0316 | 0.0000 | −0.0316 |

| Parallel circuit | 4 | 5 | 6 |
|---|---|---|---|
| Voltage [p.u.] | 1.0003 | 1.0016 | 0.9987 |
| Voltage phase [°] | 0.0000 | 0.0000 | −0.0316 |

Table 9 shows a change in the maximum values of the voltage deviation and the phase angle deviation depending on a coil pitch according to the third embodiment. When the coil pitch is within a range of 32/45 to 44/45 including those not shown in the table, the degree of balance satisfies the requirement of Habermann's patent, in which the voltage deviation be "0.4%" or smaller, and the phase angle deviation be "0.15°" or smaller.

TABLE 9

| Coil pitch | 31/45 | 32/45 | 33/45 | 34/45 | 35/45 | 36/45 |
|---|---|---|---|---|---|---|
| Voltage Deviation[%] | 0.4369 | 0.3824 | 0.3297 | 0.2786 | 0.2289 | 0.1805 |
| Phase angle Deviation[°] | 0.0746 | 0.0668 | 0.0594 | 0.0522 | 0.0451 | 0.0383 |
| Coil pitch | 37/45 | 38/45 | 39/45 | 42/45 | 43/45 | 44/45 |
| Voltage Deviation[%] | 0.1627 | 0.1627 | 0.1627 | 0.2547 | 0.2983 | 0.3417 |
| Phase angle Deviation[°] | 0.0316 | 0.0251 | 0.0187 | 0.0000 | 0.0061 | 0.0123 |

As described above, according to the third embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

Fourth Embodiment

Next, a fourth embodiment will be described with reference to FIG. 4. Here, the parts common to those of the first embodiment described above (FIG. 1) will not be repeatedly described, and the description will focus on the different parts.

Figure 4:
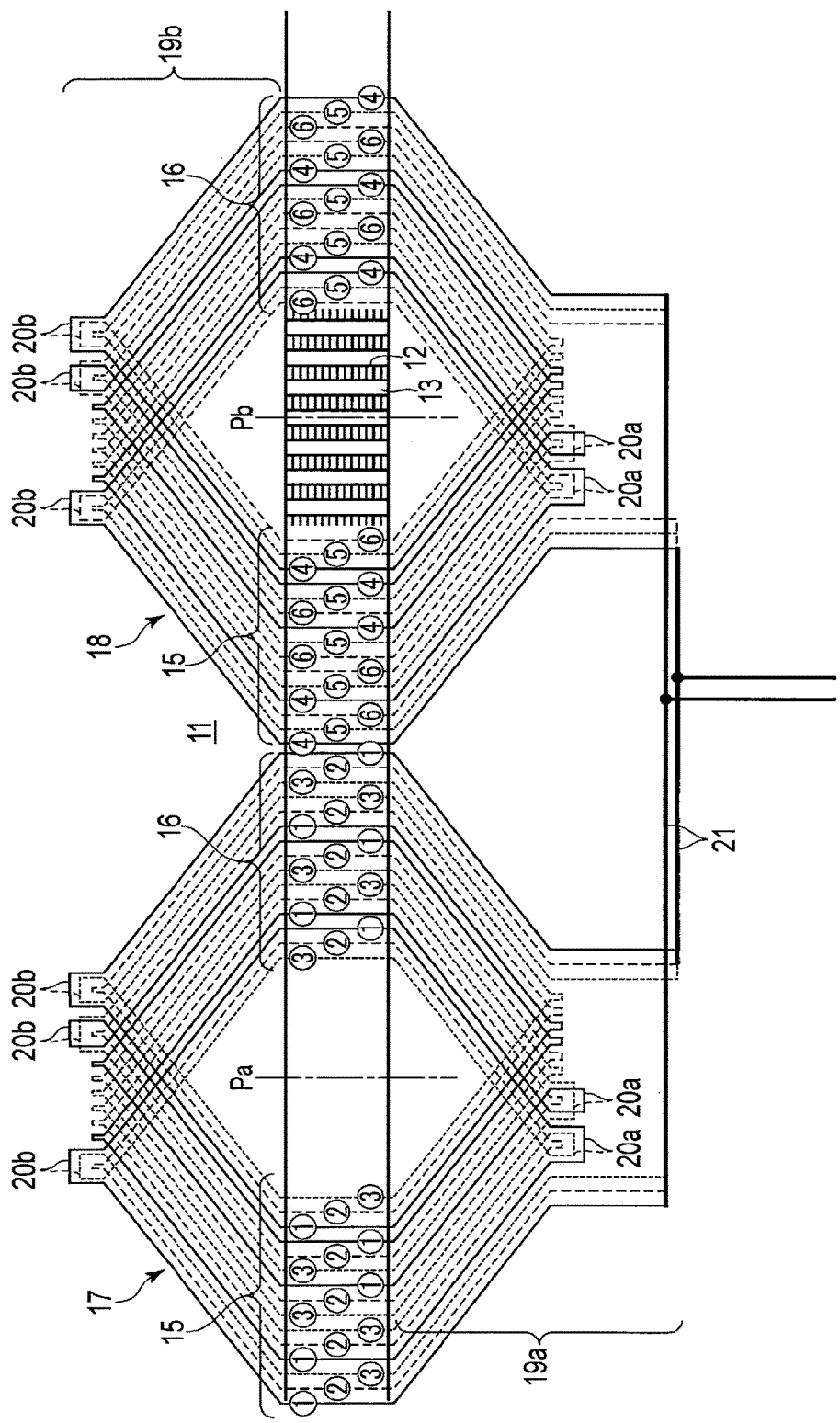
FIG. 4 is a developed perspective view illustrating a part of an armature winding of a rotating electrical machine for two poles/one phase according to a fourth embodiment.

FIG. 4 is a developed perspective view illustrating a part of an armature winding of a rotating electrical machine for two poles/one phase according to a fourth embodiment.

As illustrated in FIG. 4, eight jumper wires 20a per phase are provided in the connection side coil ends 19a of the phase belts 17 and 18, and twelve jumper wires 20b per phase are provided in the counter-connection side coil ends 19b. In addition, in the first phase belt 17, the circuits of the upper coil pieces 15 are numbered "3, 2, 1, 1, 2, 3, 1, 2, 3, 3, 2, 1, 3, 2, 1" sequentially from the pole center, and the circuits of the lower coil pieces 16 are numbered "3, 2, 1, 1, 2, 3, 3, 2, 1, 1, 2, 3, 3, 2, 1" sequentially from the pole center. In the second phase belt 18, the circuits of the upper coil pieces 15 are numbered "6, 5, 4, 4, 5, 6, 4, 5, 6, 6, 5, 4, 6, 5, 4" sequentially from the pole center, and the circuits of the lower coil pieces 16 are numbered "6, 5, 4, 4, 5, 6, 6, 5, 4, 4, 5, 6, 6, 5, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 10.

TABLE 10

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | | | 1 | 1 | | | 1 | |
| | Lower coil piece | | | 1 | 1 | | | | |
| Parallel circuits 2, 5 | Upper coil piece | | 1 | | | 1 | | | 1 |
| | Lower coil piece | | 1 | | | 1 | | | 1 |
| Parallel circuits 3, 6 | Upper coil piece | 1 | | | | | 1 | | |
| | Lower coil piece | 1 | | | | | | 1 | 1 |

TABLE 10-continued

| Relative positions from pole center | | 9 | 10 | 11 | 12 | 13 | 14 | 15 |
|---|---|---|---|---|---|---|---|---|
| Parallel circuits 1, 4 | Upper coil piece | | | | 1 | | | 1 |
| | Lower coil piece | 1 | 1 | | | | | 1 |
| Parallel circuits 2, 5 | Upper coil piece | | | 1 | | | 1 | |
| | Lower coil piece | | | 1 | | | 1 | |
| Parallel circuits 3, 6 | Upper coil piece | 1 | 1 | | | 1 | | |
| | Lower coil piece | | | | | 1 | 1 | |

As shown in Table 10, for the first and fourth parallel circuits, five upper coil pieces 15 are placed in the 3rd, 4th, 7th, 12th, and 15th positions from the pole center, and five lower coil pieces 16 are placed in the 3rd, 4th, 9th, 10th, and 15th positions from the pole center. For each of the second and fifth parallel circuits, five upper and lower coil pieces 15 and 16 are placed in the 2nd, 5th, 8th, 11th, and 14th positions from the pole center. For the third and sixth parallel circuits, five upper coil pieces 15 are placed in the 1st, 6th, 9th, 10th, and 13th positions from the pole center, and five lower coil pieces 16 are placed in the 1st, 6th, 7th, 12th, and 13th positions from the pole center.

Table 11 shows the degree of balance in the voltage generated from the armature winding according to the fourth embodiment. However, in the fourth embodiment, the degree of balance varies depending on the coil pitch. Therefore, in Table 11, the coil pitch is set to "37/45 (82.22%)." As shown in Table 11, in the armature winding according to the fourth embodiment, a voltage deviation (a deviation of a p.u. voltage from 1.0) is 0.16% at most, and a phase angle deviation is 0.03°. From Table 11, it is recognized that the armature winding according to the fourth embodiment satisfies the balance requirement of Habermann's patent, in which the voltage deviation be set to 0.4% or smaller and the phase angle deviation be set to 0.15° or smaller.

TABLE 11

| Parallel circuit | 1 | 2 | 3 |
|---|---|---|---|
| Voltage [p.u.] | 0.9997 | 1.0016 | 0.9987 |
| Voltage phase [°] | −0.0316 | 0.0000 | 0.0316 |
| Parallel circuit | 4 | 5 | 6 |
| Voltage [p.u.] | 0.9997 | 1.0016 | 0.9987 |
| Voltage phase [°] | 0.0000 | 0.0000 | 0.0316 |

Table 12 shows a change in the maximum values of the voltage deviation and the phase angle deviation depending on a coil pitch according to the fourth embodiment. When the coil pitch is within a range of 32/45 to 44/45 including those not shown in the table, the degree of balance satisfies the requirement of Habermann's patent, in which the voltage deviation be "0.4%" or smaller, and the phase angle deviation be "0.15°" or smaller.

TABLE 12

| Coil pitch | 31/45 | 32/45 | 33/45 | 34/45 | 35/45 | 36/45 |
|---|---|---|---|---|---|---|
| Voltage Deviation[%] | 0.4369 | 0.3824 | 0.3297 | 0.2786 | 0.2289 | 0.1805 |
| Phase angle Deviation[°] | 0.0746 | 0.0668 | 0.0594 | 0.0522 | 0.0451 | 0.0383 |

TABLE 12-continued

| Coil pitch | 37/45 | 38/45 | 39/45 | 42/45 | 43/45 | 44/45 |
|---|---|---|---|---|---|---|
| Voltage Deviation[%] | 0.1627 | 0.1627 | 0.1627 | 0.2547 | 0.2983 | 0.3417 |
| Phase angle Deviation[°] | 0.0316 | 0.0251 | 0.0187 | 0.0000 | 0.0061 | 0.0123 |

As described above, according to the fourth embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

Fifth Embodiment

Next, a fifth embodiment will be described with reference to FIG. 5. Here, the parts common to those of the first embodiment described above (FIG. 1) will not be repeatedly described, and the description will focus on the different parts.

Figure 5:
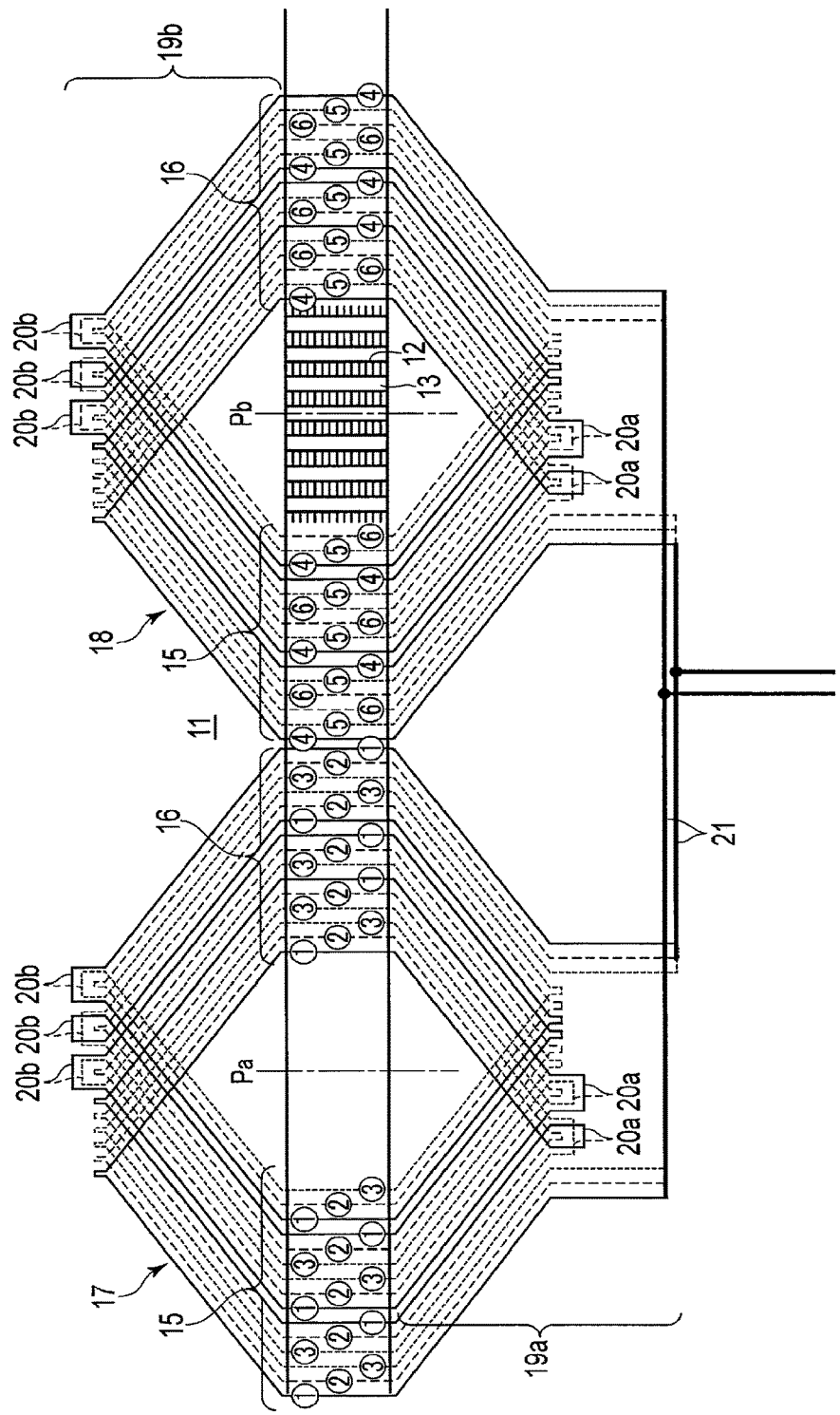
FIG. 5 is a developed perspective view illustrating a part of an armature winding of a rotating electrical machine for two poles/one phase according to a fifth embodiment.

FIG. 5 is a developed perspective view illustrating a part of an armature winding of a rotating electrical machine for two poles/one phase according to a fifth embodiment.

As illustrated in FIG. 5, eight jumper wires 20a per phase are provided in the connection side coil ends 19a of the phase belts 17 and 18, and twelve jumper wires 20b per phase are provided in the counter-connection side coil ends 19b. In addition, in the first phase belt 17, the circuits of the upper coil pieces 15 are numbered "3, 2, 1, 1, 2, 3, 3, 2, 1, 1, 2, 3, 3, 2, 1" sequentially from the pole center, and the circuits of the lower coil pieces 16 are numbered "1, 2, 3, 3, 2, 1, 3, 2, 1, 1, 2, 3, 3, 2, 1" sequentially from the pole center. In the second phase belt 18, the circuits of the upper coil pieces 15 are numbered "6, 5, 4, 4, 5, 6, 6, 5, 4, 4, 5, 6, 6, 5, 4" sequentially from the pole center, and the circuits of the lower coil pieces 16 are numbered "4, 5, 6, 6, 5, 4, 6, 5, 4, 4, 5, 6, 6, 5, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 13.

TABLE 13

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | | | | 1 | 1 | | | |
| | Lower coil piece | 1 | | | | | | 1 | |
| Parallel circuits 2, 5 | Upper coil piece | | 1 | | | 1 | | | 1 |
| | Lower coil piece | | 1 | | | 1 | | | 1 |
| Parallel circuits 3, 6 | Upper coil piece | 1 | | | | | 1 | 1 | |
| | Lower coil piece | | | 1 | 1 | | | | 1 |

| Relative positions from pole center | | 9 | 10 | 11 | 12 | 13 | 14 | 15 |
|---|---|---|---|---|---|---|---|---|
| Parallel circuits 1, 4 | Upper coil piece | 1 | 1 | | | | | 1 |
| | Lower coil piece | 1 | 1 | | | | | 1 |
| Parallel circuits 2, 5 | Upper coil piece | | | 1 | | | 1 | |
| | Lower coil piece | | | 1 | | | 1 | |
| Parallel circuits 3, 6 | Upper coil piece | | | | 1 | 1 | | |
| | Lower coil piece | | | | 1 | 1 | | |

As shown in Table 13, for the first and fourth parallel circuits, five upper coil pieces 15 are placed in the 3rd, 4th, 9th, 10th, and 15th positions from the pole center, and five lower coil pieces 16 are placed in the 1st, 6th, 9th, 10th, and 15th positions from the pole center. For each of the second and fifth parallel circuits, five upper and lower coil pieces 15 and 16 are placed in the 2nd, 5th, 8th, 11th, and 14th positions from the pole center. For the third and sixth parallel circuits, five upper coil pieces 15 are placed in the 1st, 6th, 7th, 12th, and 13th positions from the pole center, and five lower coil pieces 16 are placed in the 3rd, 4th, 7th, 12th, and 13th positions from the pole center.

Table 14 shows the degree of balance of the voltage generated from the armature winding according to the fifth embodiment. Meanwhile, according to the fifth embodiment, the degree of balance varies depending on a coil pitch. Therefore, in Table 14, the coil pitch is set to "38/45 (84.44%)." As shown in Table 14, in the armature winding according to the fifth embodiment, a voltage deviation (a deviation of a p.u. voltage from 1.0) is "0.18%" at most, and a phase angle deviation is "0.10°." It is recognized that these values satisfy the requirement of Habermann's patent, in which the voltage deviation be "0.4%" or smaller, and the phase angle deviation be "0.15°" or smaller.

TABLE 14

| Parallel circuit | 1 | 2 | 3 |
|---|---|---|---|
| Voltage [p.u.] | 1.0002 | 1.0016 | 0.9982 |
| Voltage phase [°] | 0.1018 | 0.0000 | −0.1020 |
| Parallel circuit | 4 | 5 | 6 |
| Voltage [p.u.] | 1.0010 | 1.0016 | 0.9982 |
| Voltage phase [°] | 0.0000 | 0.0000 | −0.1020 |

Table 15 shows a change in the maximum values of the voltage deviation and the phase angle deviation depending on a coil pitch according to the fifth embodiment. When the coil pitch is within a range of 33/45 to 44/45 including those not shown in the table, the degree of balance satisfies the requirement of Habermann's patent, in which the voltage deviation be "0.4%" or smaller, and the phase angle deviation be "0.15°" or smaller.

TABLE 15

| Coil pitch | 32/45 | 33/45 | 34/45 | 35/45 | 36/45 | 37/45 |
|---|---|---|---|---|---|---|
| Voltage Deviation[%] | 0.4570 | 0.3990 | 0.3427 | 0.2880 | 0.2347 | 0.1825 |
| Phase angle Deviation[°] | 0.1358 | 0.1287 | 0.1217 | 0.1150 | 0.1084 | 0.1020 |
| Coil pitch | 38/45 | 39/45 | 40/45 | 42/45 | 43/45 | 44/45 |
| Voltage Deviation[%] | 0.1627 | 0.1627 | 0.1627 | 0.2281 | 0.2761 | 0.3240 |
| Phase angle Deviation[°] | 0.0957 | 0.0895 | 0.0835 | 0.0717 | 0.0659 | 0.0601 |

As described above, according to the fifth embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

Sixth Embodiment

Next, a sixth embodiment will be described with reference to FIG. 6. Here, the parts common to those of the first embodiment described above (FIG. 1) will not be repeatedly described, and the description will focus on the different parts.

FIG. 6 is a developed perspective view illustrating a part of an armature winding of a rotating electrical machine for two poles/one phase according to a sixth embodiment.

As illustrated in FIG. 6, twelve jumper wires 20b per phase are provided only in the counter-connection side coil ends 19b of the phase belts 17 and 18. In addition, in the first phase belt 17, the circuits of the upper coil pieces 15 are numbered "3, 2, 1, 1, 2, 3, 1, 2, 3, 3, 2, 1, 3, 2, 1" sequentially from the pole center, and the circuits of the lower coil pieces 16 are numbered "1, 2, 3, 3, 2, 1, 3, 2, 1, 1, 2, 3, 3, 2, 1" sequentially from the pole center. In the second phase belt 18, the circuits of the upper coil pieces 15 are numbered "6, 5, 4, 4, 5, 6, 4, 5, 6, 6, 5, 4, 6, 5, 4" sequentially from the pole center, and the circuits of the lower coil pieces 16 are numbered "4, 5, 6, 6, 5, 4, 6, 5, 4, 4, 5, 6, 6, 5, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 16.

TABLE 16

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | | | 1 | 1 | | | 1 | |
| | Lower coil piece | 1 | | | | | 1 | | |
| Parallel circuits 2, 5 | Upper coil piece | | 1 | | | 1 | | | 1 |
| | Lower coil piece | | 1 | | | 1 | | | 1 |
| Parallel circuits 3, 6 | Upper coil piece | 1 | | | | | 1 | 1 | |
| | Lower coil piece | | | 1 | 1 | | | 1 | |
| Relative positions from pole center | | 9 | 10 | 11 | 12 | 13 | 14 | 15 | |
| Parallel circuits 1, 4 | Upper coil piece | | | | 1 | | | 1 | |
| | Lower coil piece | 1 | 1 | | | | | 1 | |
| Parallel circuits 2, 5 | Upper coil piece | | | 1 | | | 1 | | |
| | Lower coil piece | | | 1 | | | 1 | | |
| Parallel circuits 3, 6 | Upper coil piece | 1 | 1 | | 1 | | | | |
| | Lower coil piece | | | | 1 | 1 | | | |

As shown in Table 16, for the first and fourth parallel circuits, five upper coil pieces 15 are placed in the 3rd, 4th, 7th, 12th, and 15th positions from the pole center, and five lower coil pieces 16 are placed in the 1st, 6th, 9th, 10th, and 15th positions from the pole center. For each of the second and fifth parallel circuits, five upper and lower coil pieces 15 and 16 are placed in the 2nd, 5th, 8th, 11th, and 14th positions from the pole center. For the third and sixth parallel circuits, five upper coil pieces 15 are placed in the 1st, 6th, 9th, 10th, and 13th positions from the pole center, and five lower coil pieces 16 are placed in the 3rd, 4th, 7th, 12th, and 13th positions from the pole center.

Table 17 shows the degree of balance of the voltage generated from the armature winding according to the sixth embodiment. Meanwhile, according to the sixth embodiment, the degree of balance varies depending on a coil pitch. Therefore, in Table 17, the coil pitch is set to "38/45 (84.44%)." As shown in Table 17, in the armature winding according to the sixth embodiment, a voltage deviation (a deviation of a p.u. voltage from 1.0) is "0.29%" at most, and a phase angle deviation is "0.07°." It is recognized that these values satisfy the requirement of Habermann's patent, in which the voltage deviation be "0.4%" or smaller, and the phase angle deviation be "0.15°" or smaller.

TABLE 17

| Parallel circuit | 1 | 2 | 3 |
|---|---|---|---|
| Voltage [p.u.] | 0.9971 | 1.0016 | 1.0013 |
| Voltage phase [°] | 0.0704 | 0.0000 | −0.0701 |
| Parallel circuit | 4 | 5 | 6 |
| Voltage [p.u.] | 1.0007 | 1.0016 | 1.0013 |
| Voltage phase [°] | 0.0000 | 0.0000 | −0.0701 |

Table 18 shows a change in the maximum values of the voltage deviation and the phase angle deviation depending on a coil pitch according to the sixth embodiment. When the coil pitch is within a range of 28/45 to 39/45 including those not shown in the table, the degree of balance satisfies the requirement of Habermann's patent, in which the voltage deviation be "0.4%" or smaller, and the phase angle deviation be "0.15°" or smaller.

TABLE 18

| Coil pitch | 27/45 | 28/45 | 29/45 | 30/45 | 33/45 | 34/45 |
|---|---|---|---|---|---|---|
| Voltage Deviation[%] | 0.4566 | 0.3872 | 0.3210 | 0.2576 | 0.1627 | 0.1627 |
| Phase angle Deviation[°] | 0.0671 | 0.0675 | 0.0678 | 0.0681 | 0.0690 | 0.0694 |
| Coil pitch | 35/45 | 36/45 | 37/45 | 38/45 | 39/45 | 40/45 |
| Voltage Deviation[%] | 0.1897 | 0.2418 | 0.2927 | 0.3427 | 0.3917 | 0.4401 |
| Phase angle Deviation[°] | 0.0697 | 0.0701 | 0.0704 | 0.0707 | 0.0710 | 0.0713 |

As described above, according to the sixth embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

Seventh Embodiment

Next, a seventh embodiment will be described with reference to FIG. 7. Here, the parts common to those of the first embodiment described above (FIG. 1) will not be repeatedly described, and the description will focus on the different parts.

Figure 7:
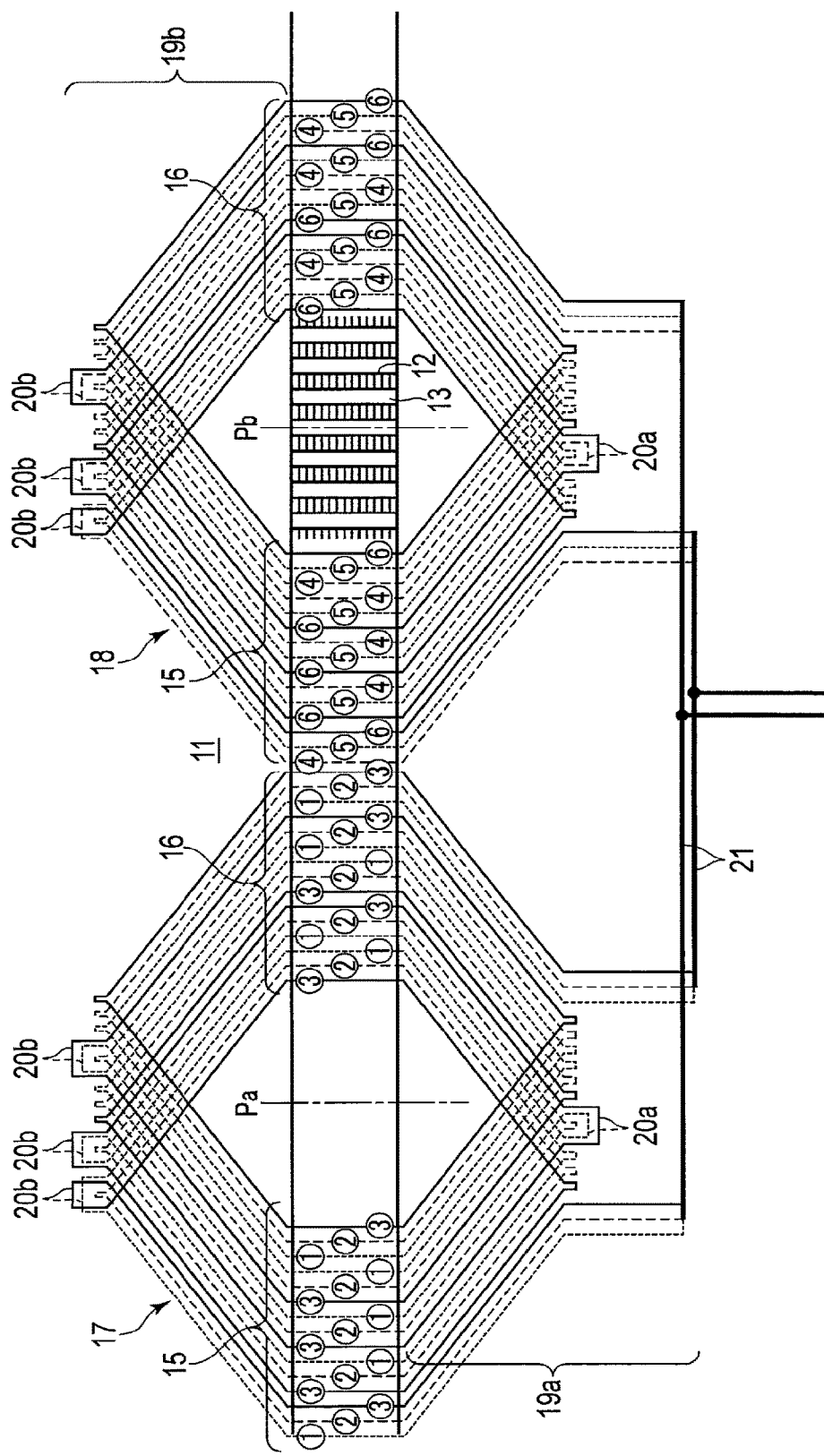
FIG. 7 is a developed perspective view illustrating a part of an armature winding of a rotating electrical machine for two poles/one phase according to a seventh embodiment.

FIG. 7 is a developed perspective view illustrating a part of an armature winding of a rotating electrical machine for two poles/one phase according to a seventh embodiment.

As illustrated in FIG. 7, four jumper wires 20a per phase are provided in the connection side coil ends 19a of the phase belts 17 and 18, and twelve jumper wires 20b per phase are provided in the counter-connection side coil ends 19b. In addition, in the first phase belt 17, the circuits of the upper coil pieces 15 are numbered "3, 2, 1, 1, 2, 3, 1, 2, 3, 1, 2, 3, 3, 2, 1" sequentially from the pole center, and the circuits of the lower coil pieces 16 are numbered "3, 2, 1, 1, 2, 3, 3, 2, 1, 1, 2, 3, 1, 2, 3" sequentially from the pole center. In the second phase belt 18, the circuits of the upper coil pieces 15 are numbered "6, 5, 4, 4, 5, 6, 4, 5, 6, 4, 5, 6, 6, 5, 4" sequentially from the pole center, and the circuits of the lower coil pieces 16 are numbered "6, 5, 4, 4, 5, 6, 6, 5, 4, 4, 5, 6, 4, 5, 6" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 19.

TABLE 19

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | | | 1 | 1 | | | 1 | |
| | Lower coil piece | | | 1 | 1 | | | | |
| Parallel circuits 2, 5 | Upper coil piece | | 1 | | | 1 | | | 1 |
| | Lower coil piece | | 1 | | | 1 | | | 1 |
| Parallel circuits 3, 6 | Upper coil piece | 1 | | | | | 1 | | |
| | Lower coil piece | 1 | | | | | 1 | 1 | |
| Relative positions from pole center | | 9 | 10 | 11 | 12 | 13 | 14 | 15 | |
| Parallel circuits 1, 4 | Upper coil piece | | 1 | | | | | 1 | |
| | Lower coil piece | 1 | 1 | | | 1 | | | |
| Parallel circuits 2, 5 | Upper coil piece | | | 1 | | | 1 | | |
| | Lower coil piece | | | 1 | | | 1 | | |
| Parallel circuits 3, 6 | Upper coil piece | 1 | | | 1 | 1 | | | |
| | Lower coil piece | | | | 1 | | | 1 | |

As shown in Table 19, for the first and fourth parallel circuits, five upper coil pieces 15 are placed in the 3rd, 4th, 7th, 10th, and 15th positions from the pole center, and five lower coil pieces 16 are placed in the 3rd, 4th, 9th, 10th, and 13th positions from the pole center. For each of the second and fifth parallel circuits, five upper and lower coil pieces 15 and 16 are placed in the 2nd, 5th, 8th, 11th, and 14th positions from the pole center. For the third and sixth parallel circuits, five upper coil pieces 15 are placed in the 1st, 6th, 9th, 12th, and 13th positions from the pole center, and five lower coil pieces 16 are placed in the 1st, 6th, 7th, 12th, and 15th positions from the pole center.

Table 20 shows the degree of balance of the voltage generated from the armature winding according to the seventh embodiment. Meanwhile, according to the seventh embodiment, the degree of balance varies depending on a coil pitch. Therefore, in Table 20, the coil pitch is set to "38/45 (84.44%)." As shown in Table 20, in the armature winding according to the seventh embodiment, a voltage deviation (a deviation of a p.u. voltage from 1.0) is "0.24%" at most, and a phase angle deviation is "0.03°." It is recognized that these values satisfy the requirement of Habermann's patent, in which the voltage deviation be "0.4%" or smaller, and the phase angle deviation be "0.15°" or smaller.

TABLE 20

| Parallel circuit | 1 | 2 | 3 |
|---|---|---|---|
| Voltage [p.u.] | 1.0008 | 1.0016 | 0.9976 |
| Voltage phase [°] | −0.0252 | 0.0000 | 0.0253 |
| Parallel circuit | 4 | 5 | 6 |
| Voltage [p.u.] | 1.0008 | 1.0016 | 0.9976 |
| Voltage phase [°] | −0.0252 | 0.0000 | 0.0253 |

Table 21 shows a change of the maximum values of the voltage deviation and the phase angle deviation depending on a coil pitch according to the seventh embodiment. When the coil pitch is within a range of "30/45 to 39/45," the degree of balance satisfies the requirement of Habermann's patent, in which the voltage deviation be "0.4%" or smaller, and the phase angle deviation be "0.15°" or smaller.

TABLE 21

| Coil pitch | 29/45 | 30/45 | 31/45 | 32/45 | 33/45 | 34/45 |
|---|---|---|---|---|---|---|
| Voltage Deviation[%] | 0.4387 | 0.3664 | 0.2969 | 0.2300 | 0.1653 | 0.1627 |
| Phase angle Deviation[°] | 0.1410 | 0.1246 | 0.1090 | 0.0939 | 0.0793 | 0.0652 |
| Coil pitch | 35/45 | 36/45 | 37/45 | 38/45 | 39/45 | 40/45 |
| Voltage Deviation[%] | 0.1627 | 0.1805 | 0.2387 | 0.2957 | 0.3517 | 0.4069 |
| Phase angle Deviation[°] | 0.0516 | 0.0383 | 0.0253 | 0.0126 | 0.0000 | 0.0124 |

As described above, according to the seventh embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

Eighth Embodiment

Next, an eighth embodiment will be described with reference to FIG. 8. Here, the parts common to those of the first embodiment described above (FIG. 1) will not be repeatedly described, and the description will focus on the different parts.

Figure 8:
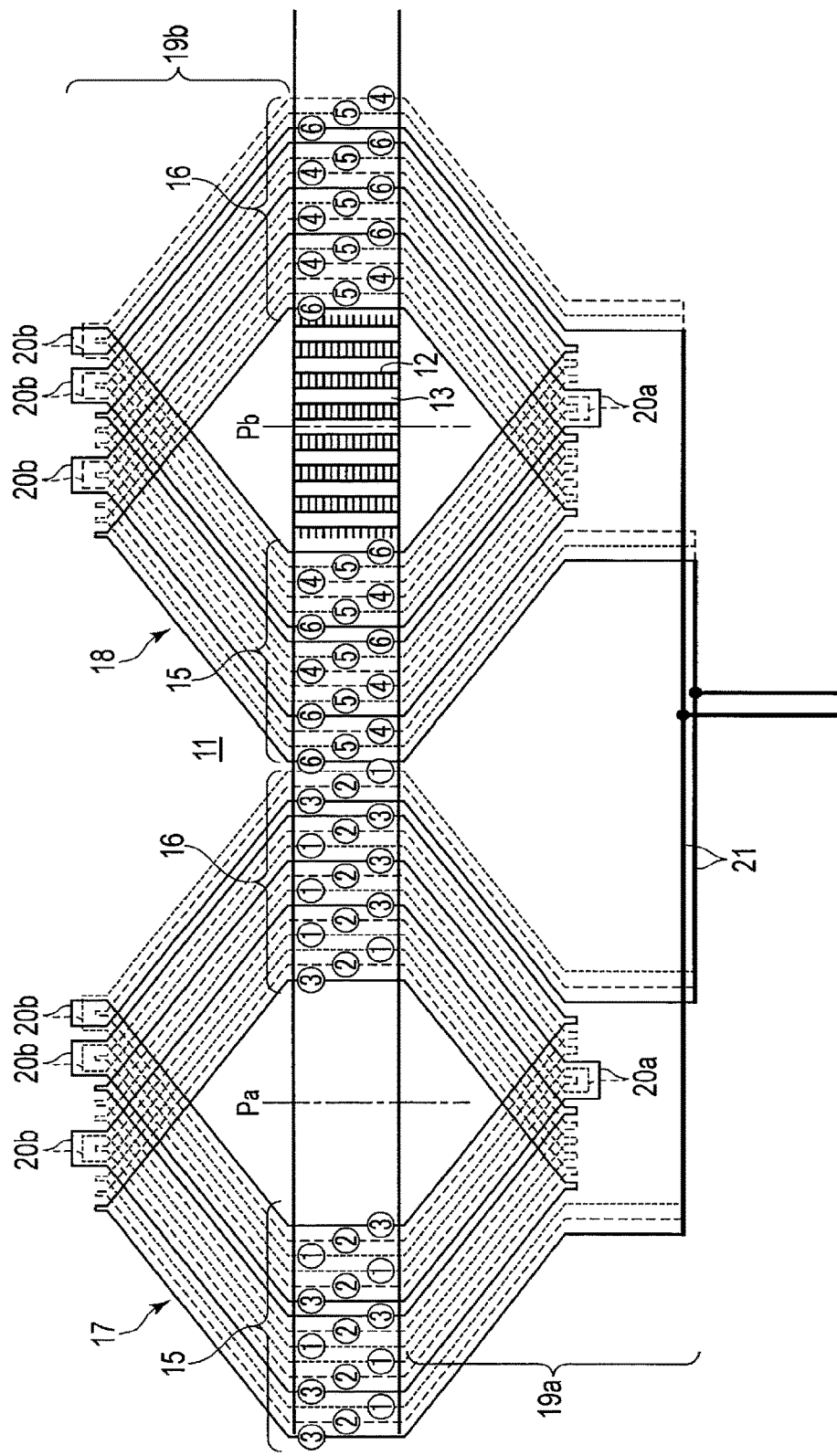
FIG. 8 is a developed perspective view illustrating a part of an armature winding of a rotating electrical machine for two poles/one phase according to an eighth embodiment.

FIG. 8 is a developed perspective view illustrating a part of an armature winding of a rotating electrical machine for two poles/one phase according to an eighth embodiment.

As illustrated in FIG. 8, four jumper wires 20a per phase are provided in the connection side coil ends 19a of the phase belts 17 and 18, and twelve jumper wires 20b per phase are provided in the counter-connection side coil ends 19b. In addition, in the first phase belt 17, the circuits of the upper coil pieces 15 are numbered "3, 2, 1, 1, 2, 3, 3, 2, 1, 1, 2, 3, 1, 2, 3" sequentially from the pole center, and the circuits of the lower coil pieces 16 are numbered "3, 2, 1, 1, 2, 3, 1, 2, 3, 1, 2, 3, 3, 2, 1" sequentially from the pole center. In the second phase belt 18, the circuits of the upper coil pieces 15 are numbered "6, 5, 4, 4, 5, 6, 6, 5, 4, 4, 5, 6, 4, 5, 6" sequentially from the pole center, and the circuits of the lower coil pieces 16 are numbered "6, 5, 4, 4, 5, 6, 4, 5, 6, 4, 5, 6, 6, 5, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 22.

TABLE 22

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | | | 1 | 1 | | | | |
| | Lower coil piece | | | 1 | 1 | | | 1 | |
| Parallel circuits 2, 5 | Upper coil piece | | 1 | | | 1 | | | 1 |
| | Lower coil piece | | 1 | | | 1 | | | 1 |
| Parallel circuits 3, 6 | Upper coil piece | 1 | | | | | 1 | 1 | |

TABLE 22-continued

| | | | | | | | | |
|---|---|---|---|---|---|---|---|---|
| circuits 3, 6 | Lower coil piece | 1 | | | | | 1 | |
| Relative positions from pole center | | 9 | 10 | 11 | 12 | 13 | 14 | 15 |
| Parallel circuits 1, 4 | Upper coil piece | 1 | 1 | | 1 | | | |
| | Lower coil piece | | 1 | | | | | 1 |
| Parallel circuits 2, 5 | Upper coil piece | | | 1 | | | 1 | |
| | Lower coil piece | | | 1 | | | 1 | |
| Parallel circuits 3, 6 | Upper coil piece | | | | 1 | | | 1 |
| | Lower coil piece | 1 | | | | 1 | 1 | |

As shown in Table 22, for the first and fourth parallel circuits, five upper coil pieces 15 are placed in the 3rd, 4th, 9th, 10th, and 13th positions from the pole center, and five lower coil pieces 16 are placed in the 3rd, 4th, 7th, 10th, and 15th positions from the pole center. For each of the second and fifth parallel circuits, five upper and lower coil pieces 15 and 16 are placed in the 2nd, 5th, 8th, 11th, and 14th positions from the pole center. For the third and sixth parallel circuits, five upper coil pieces 15 are placed in the 1st, 6th, 7th, 12th, and 15th positions from the pole center, and five lower coil pieces 16 are placed in the 1st, 6th, 9th, 12th, and 13th positions from the pole center.

Table 23 shows the degree of balance of the voltage generated from the armature winding according to the eighth embodiment. Meanwhile, according to the eighth embodiment, the degree of balance varies depending on a coil pitch. Therefore, in Table 23, the coil pitch is set to "38/45 (84.44%)." As shown in Table 23, in the armature winding according to the eighth embodiment, a voltage deviation (a deviation of a p.u. voltage from 1.0) is "0.24%" at most, and a phase angle deviation is "0.03°." It is recognized that these values satisfy the requirement of Habermann's patent, in which the voltage deviation be "0.4%" or smaller, and the phase angle deviation be "0.15°" or smaller.

TABLE 23

| Parallel circuit | 1 | 2 | 3 |
|---|---|---|---|
| Voltage [p.u.] | 1.0008 | 1.0016 | 0.9976 |
| Voltage phase [°] | 0.0252 | 0.0000 | −0.0253 |
| Parallel circuit | 4 | 5 | 6 |
| Voltage [p.u.] | 1.0008 | 1.0016 | 0.9976 |
| Voltage phase [°] | 0.0252 | 0.0000 | −0.0253 |

Table 24 shows a change of the maximum values of the voltage deviation and the phase angle deviation depending on a coil pitch according to the eighth embodiment. When the coil pitch is within a range of "30/45 to 39/45," the degree of balance satisfies the requirement of Habermann's patent, in which the voltage deviation be "0.4%" or smaller, and the phase angle deviation be "0.15°" or smaller.

TABLE 24

| Coil pitch | 29/45 | 30/45 | 31/45 | 32/45 | 33/45 | 34/45 |
|---|---|---|---|---|---|---|
| Voltage Deviation[%] | 0.4387 | 0.3664 | 0.2969 | 0.2300 | 0.1653 | 0.1627 |
| Phase angle Deviation[°] | 0.1410 | 0.1246 | 0.1090 | 0.0939 | 0.0793 | 0.0652 |

TABLE 24-continued

| Coil pitch | 35/45 | 36/45 | 37/45 | 38/45 | 39/45 | 40/45 |
|---|---|---|---|---|---|---|
| Voltage Deviation[%] | 0.1627 | 0.1805 | 0.2387 | 0.2957 | 0.3517 | 0.4069 |
| Phase angle Deviation[°] | 0.0516 | 0.0383 | 0.0253 | 0.0126 | 0.0000 | 0.0124 |

As described above, according to the eighth embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

Ninth Embodiment

Next, a ninth embodiment will be described with reference to FIG. 9. Here, the parts common to those of the first embodiment described above (FIG. 1) will not be repeatedly described, and the description will focus on the different parts.

Figure 9:
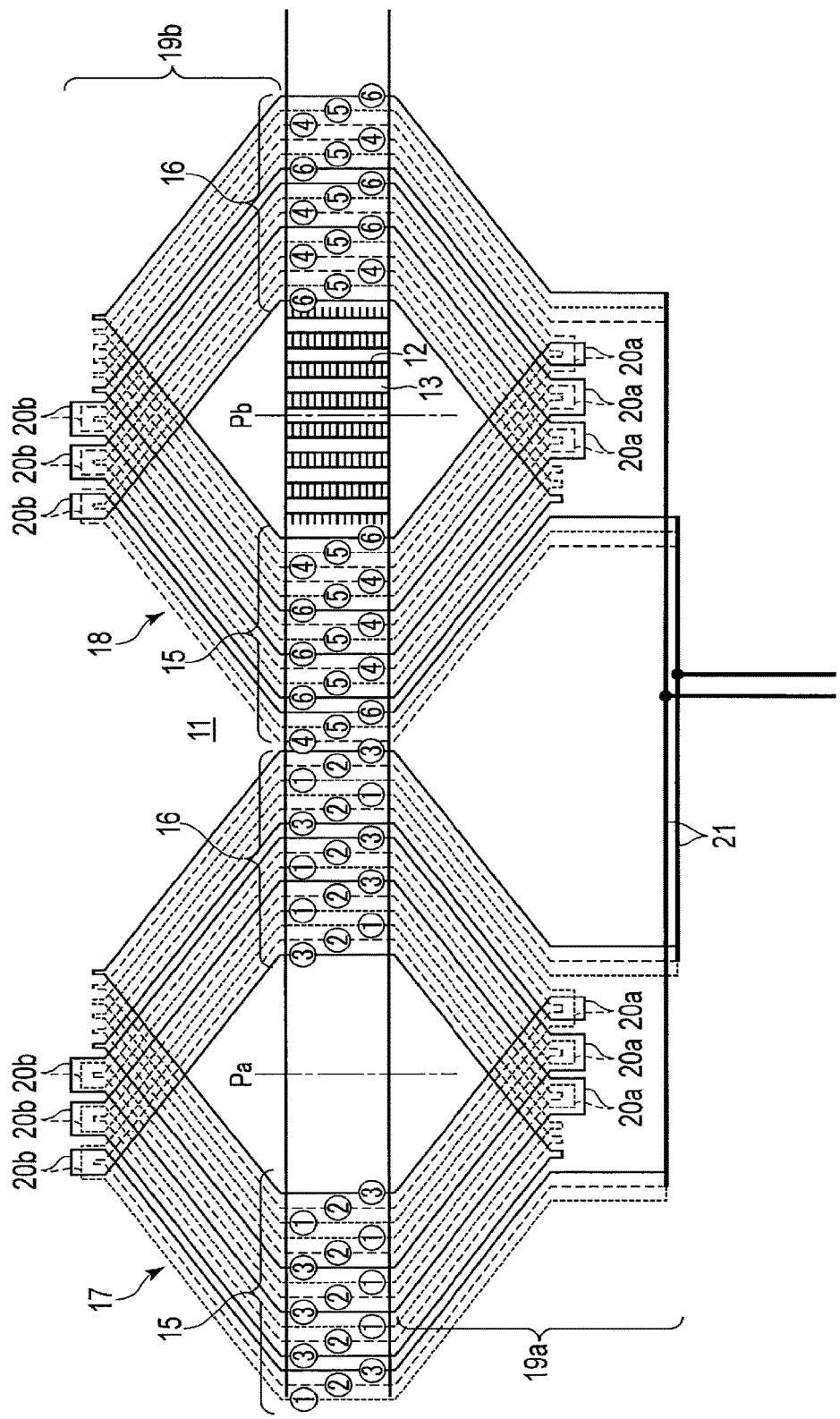
FIG. 9 is a developed perspective view illustrating a part of an armature winding of a rotating electrical machine for two poles/one phase according to an ninth embodiment.

FIG. 9 is a developed perspective view illustrating a part of an armature winding of a rotating electrical machine for two poles/one phase according to a ninth embodiment.

As illustrated in FIG. 9, twelve jumper wires 20a per phase are provided in the connection side coil ends 19a of the phase belts 17 and 18, and twelve jumper wires 20b per phase are provided in the counter-connection side coil ends 19b. In addition, in the first phase belt 17, the circuits of the upper coil pieces 15 are numbered "3, 2, 1, 1, 2, 3, 1, 2, 3, 1, 2, 3, 3, 2, 1" sequentially from the pole center, and the circuits of the lower coil pieces 16 are numbered "3, 2, 1, 1, 2, 3, 1, 2, 3, 3, 2, 1, 1, 2, 3" sequentially from the pole center. In the second phase belt 18, the circuits of the upper coil pieces 15 are numbered "6, 5, 4, 4, 5, 6, 4, 5, 6, 4, 5, 6, 6, 5, 4" sequentially from the pole center, and the circuits of the lower coil pieces 16 are numbered "6, 5, 4, 4, 5, 6, 4, 5, 6, 6, 5, 4, 4, 5, 6" sequentially from the pole center.

As a result, when relative positions of the upper and lower coil pieces 15 and 16 in the phase belt are expressed by positions from the pole center, the upper and lower coil pieces 15 and 16 of each parallel circuit are placed as shown in Table 25.

TABLE 25

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | | | 1 | 1 | | | 1 | |
| | Lower coil piece | | | 1 | 1 | | | 1 | |
| Parallel circuits 2, 5 | Upper coil piece | | 1 | | | 1 | | | 1 |
| | Lower coil piece | | 1 | | | 1 | | | 1 |
| Parallel circuits 3, 6 | Upper coil piece | 1 | | | | | 1 | | |
| | Lower coil piece | 1 | | | | | 1 | | |

| Relative positions from pole center | | 9 | 10 | 11 | 12 | 13 | 14 | 15 |
|---|---|---|---|---|---|---|---|---|
| Parallel circuits 1, 4 | Upper coil piece | | 1 | | | | | 1 |
| | Lower coil piece | | | | 1 | 1 | | |
| Parallel circuits 2, 5 | Upper coil piece | | | 1 | | | 1 | |
| | Lower coil piece | | | 1 | | | 1 | |
| Parallel circuits 3, 6 | Upper coil piece | 1 | | | 1 | 1 | | |
| | Lower coil piece | 1 | 1 | | | | | 1 |

As shown in Table 25, for the first and fourth parallel circuits, five upper coil pieces 15 are placed in the 3rd, 4th, 7th, 10th, and 15th positions from the pole center, and five lower coil pieces 16 are placed in the 3rd, 4th, 7th, 12th, and 13th positions from the pole center. For each of the second and fifth parallel circuits, five upper and lower coil pieces 15 and 16 are placed in the 2nd, 5th, 8th, 11th, and 14th positions from the pole center. For the third and sixth parallel circuits, five upper coil pieces 15 are placed in the 1st, 6th, 9th, 12th, and 13th positions from the pole center, and five lower coil pieces 16 are placed in the 1st, 6th, 9th, 10th, and 15th positions from the pole center.

Table 26 shows the degree of balance of the voltage generated from the armature winding according to the ninth embodiment. Meanwhile, according to the ninth embodiment, the degree of balance varies depending on a coil pitch. Therefore, in Table 26, the coil pitch is set to "38/45 (84.44%)." As shown in Table 26, in the armature winding according to the ninth embodiment, a voltage deviation (a deviation of a p.u. voltage from 1.0) is "0.24%" at most, and a phase angle deviation is "0.01°." It is recognized that these values satisfy the requirement of Habermann's patent, in which the voltage deviation be "0.4%" or smaller, and the phase angle deviation be "0.15°" or smaller.

TABLE 26

| Parallel circuit | 1 | 2 | 3 |
|---|---|---|---|
| Voltage [p.u.] | 0.9976 | 1.0016 | 1.0007 |
| Voltage phase [°] | 0.0064 | 0.0000 | −0.0063 |
| Parallel circuit | 4 | 5 | 6 |
| Voltage [p.u.] | 0.9976 | 1.0016 | 1.0007 |
| Voltage phase [°] | 0.0064 | 0.0000 | −0.0063 |

Table 27 shows a change in the maximum values of the voltage deviation and the phase angle deviation depending on a coil pitch according to the ninth embodiment. When the coil pitch is within a range of 35/45 to 44/45, the degree of balance satisfies the requirement of Habermann's patent, in which the voltage deviation be "0.4%" or smaller, and the phase angle deviation be "0.15°" or smaller.

TABLE 27

| Coil pitch | 34/45 | 35/45 | 36/45 | 37/45 | 38/45 | 39/45 |
|---|---|---|---|---|---|---|
| Voltage Deviation[%] | 0.4198 | 0.3569 | 0.2962 | 0.2368 | 0.1786 | 0.1627 |
| Phase angle Deviation[°] | 3.1370 | 0.0065 | 0.0000 | 0.0064 | 0.0126 | 0.0187 |
| Coil pitch | 40/45 | 41/45 | 42/45 | 43/45 | 44/45 | |
| Voltage Deviation[%] | 0.1627 | 0.1627 | 0.2083 | 0.2630 | 0.3174 | |
| Phase angle Deviation[°] | 0.0247 | 0.0307 | 0.0367 | 0.0425 | 0.0484 | |

As described above, according to the ninth embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

Tenth Embodiment

Next, a tenth embodiment will be described with reference to FIG. 10. Here, the parts common to those of the first embodiment described above (FIG. 1) will not be repeatedly described, and the description will focus on the different parts.

Figure 10:
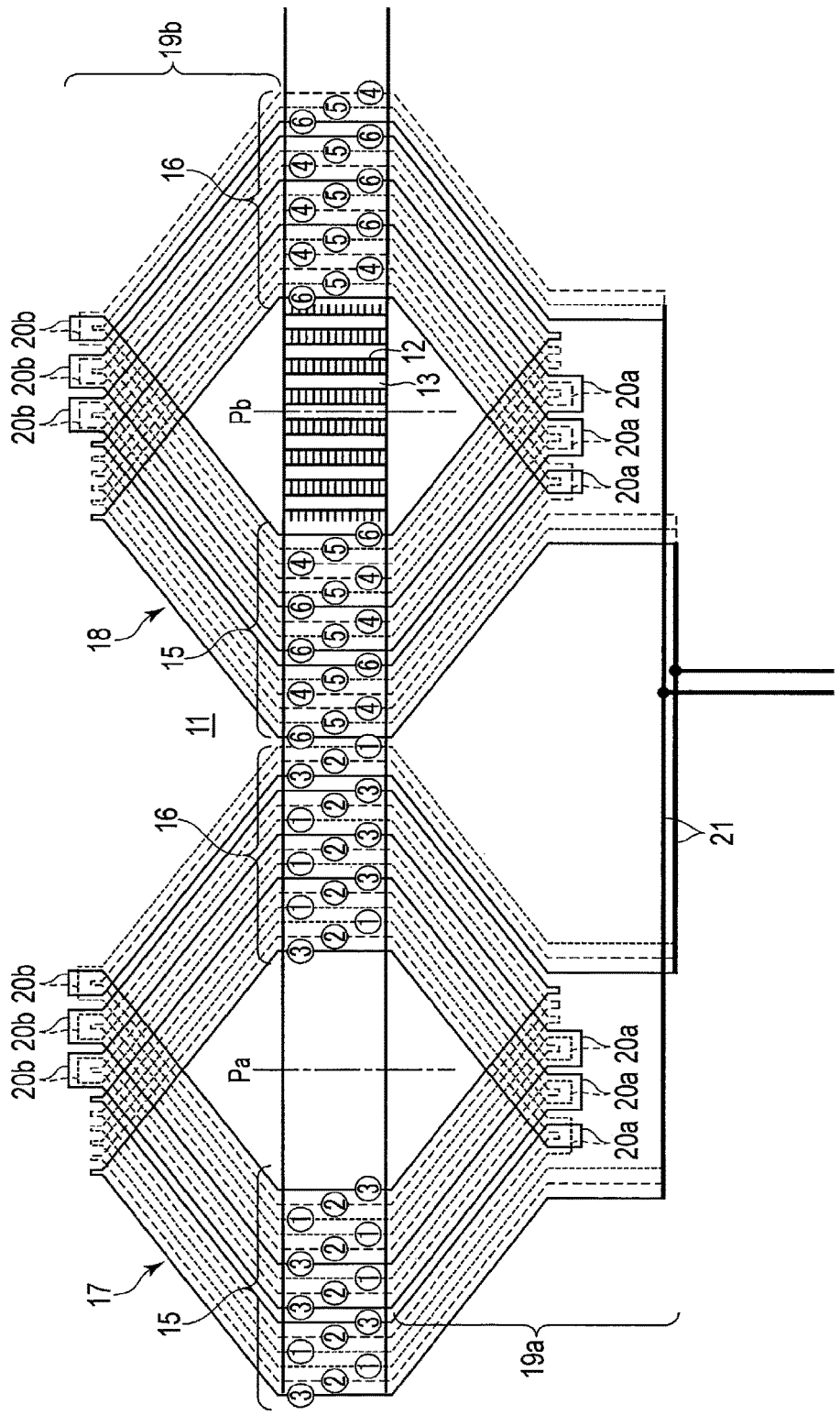
FIG. 10 is a developed perspective view illustrating a part of an armature winding of a rotating electrical machine for two poles/one phase according to an tenth embodiment.

FIG. 10 is a developed perspective view illustrating a part of an armature winding of a rotating electrical machine for two poles/one phase according to a tenth embodiment.

As illustrated in FIG. 10, twelve jumper wires 20a per phase are provided in the connection side coil ends 19a of the phase belts 17 and 18, and twelve jumper wires 20b per phase are provided in the counter-connection side coil ends 19b. In addition, in the first phase belt 17, the circuits of the upper coil pieces 15 are numbered "3, 2, 1, 1, 2, 3, 1, 2, 3, 3, 2, 1, 1, 2, 3" sequentially from the pole center, and the circuits of the lower coil pieces 16 are numbered "3, 2, 1, 1, 2, 3, 1, 2, 3, 1, 2, 3, 3, 2, 1" sequentially from the pole center. In the second phase belt 18, the circuits of the upper coil pieces 15 are numbered "6, 5, 4, 4, 5, 6, 4, 5, 6, 6, 5, 4, 4, 5, 6" sequentially from the pole center, and the circuits of the lower coil pieces 16 are numbered "6, 5, 4, 4, 5, 6, 4, 5, 6, 4, 5, 6, 6, 5, 4" sequentially from the pole center.

As a result, when relative positions of the upper and lower coil pieces 15 and 16 in the phase belt are expressed by positions from the pole center, the upper and lower coil pieces 15 and 16 of each parallel circuit are placed as shown in Table 28.

TABLE 28

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | | | 1 | 1 | | | 1 | |
| | Lower coil piece | | | 1 | 1 | | | 1 | |
| Parallel circuits 2, 5 | Upper coil piece | | 1 | | | 1 | | | 1 |
| | Lower coil piece | | 1 | | | 1 | | | 1 |
| Parallel circuits 3, 6 | Upper coil piece | 1 | | | | | 1 | | |
| | Lower coil piece | 1 | | | | | 1 | | |

| Relative positions from pole center | | 9 | 10 | 11 | 12 | 13 | 14 | 15 |
|---|---|---|---|---|---|---|---|---|
| Parallel circuits 1, 4 | Upper coil piece | | | | 1 | 1 | | |
| | Lower coil piece | | 1 | | | | | 1 |
| Parallel circuits 2, 5 | Upper coil piece | | | 1 | | | 1 | |
| | Lower coil piece | | | 1 | | | 1 | |
| Parallel circuits 3, 6 | Upper coil piece | 1 | 1 | | | | | 1 |
| | Lower coil piece | 1 | | | 1 | 1 | | |

As shown in Table 28, for the first and fourth parallel circuits, five upper coil pieces 15 are placed in the 3rd, 4th, 7th, 12th, and 13th positions from the pole center, and five lower coil pieces 16 are placed in the 3rd, 4th, 7th, 10th, and 15th positions from the pole center. For each of the second and fifth parallel circuits, five upper and lower coil pieces 15 and 16 are placed in the 2nd, 5th, 8th, 11th, and 14th positions from the pole center. For the third and sixth parallel circuits, five upper coil pieces 15 are placed in the 1st, 6th, 9th, 10th, and 15th positions from the pole center, and five lower coil pieces 16 are placed in the 1st, 6th, 9th, 12th, and 13th positions from the pole center.

Table 29 shows the degree of balance of the voltage generated from the armature winding according to the tenth embodiment. Meanwhile, according to the tenth embodiment, the degree of balance varies depending on a coil pitch. Therefore, in Table 29, the coil pitch is set to "38/45 (84.44%)." As shown in Table 29, in the armature winding according to the tenth embodiment, a voltage deviation (a deviation of a p.u. voltage from 1.0) is "0.24%" at most, and a phase angle deviation is "0.01°." It is recognized that these values satisfy the requirement of Habermann's patent, in which the voltage deviation be "0.4%" or smaller, and the phase angle deviation be "0.15°" or smaller.

TABLE 29

| Parallel circuit | 1 | 2 | 3 |
|---|---|---|---|
| Voltage [p.u.] | 0.9976 | 1.0016 | 1.0007 |
| Voltage phase [°] | −0.0064 | 0.0000 | 0.0063 |
| Parallel circuit | 4 | 5 | 6 |
| Voltage [p.u.] | 0.9976 | 1.0016 | 1.0007 |
| Voltage phase [°] | −0.0064 | 0.0000 | 0.0063 |

Table 30 shows a change in the maximum values of the voltage deviation and the phase angle deviation depending on a coil pitch according to the tenth embodiment. When the coil pitch is within a range of 35/45 to 44/45, the degree of balance satisfies the requirement of Habermann's patent, in which the voltage deviation be "0.4%" or smaller, and the phase angle deviation be "0.15°" or smaller.

TABLE 30

| Coil pitch | 34/45 | 35/45 | 36/45 | 37/45 | 38/45 | 39/45 |
|---|---|---|---|---|---|---|
| Voltage Deviation[%] | 0.4192 | 0.3569 | 0.2962 | 0.2368 | 0.1786 | 0.1627 |
| Phase angle Deviation[°] | 0.0132 | 0.0065 | 0.0000 | 0.0064 | 0.0126 | 0.0187 |
| Coil pitch | 40/45 | 41/45 | 42/45 | 43/45 | 44/45 | |
| Voltage Deviation[%] | 0.1627 | 0.1627 | 0.2083 | 0.2630 | 0.3174 | |
| Phase angle Deviation[°] | 0.0247 | 0.0307 | 0.0367 | 0.0425 | 0.0484 | |

As described above, according to the tenth embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

Eleventh Embodiment

Next, an eleventh embodiment will be described with reference to FIG. 11. Here, the parts common to those of the first embodiment described above (FIG. 1) will not be repeatedly described, and the description will focus on the different parts.

Figure 11:
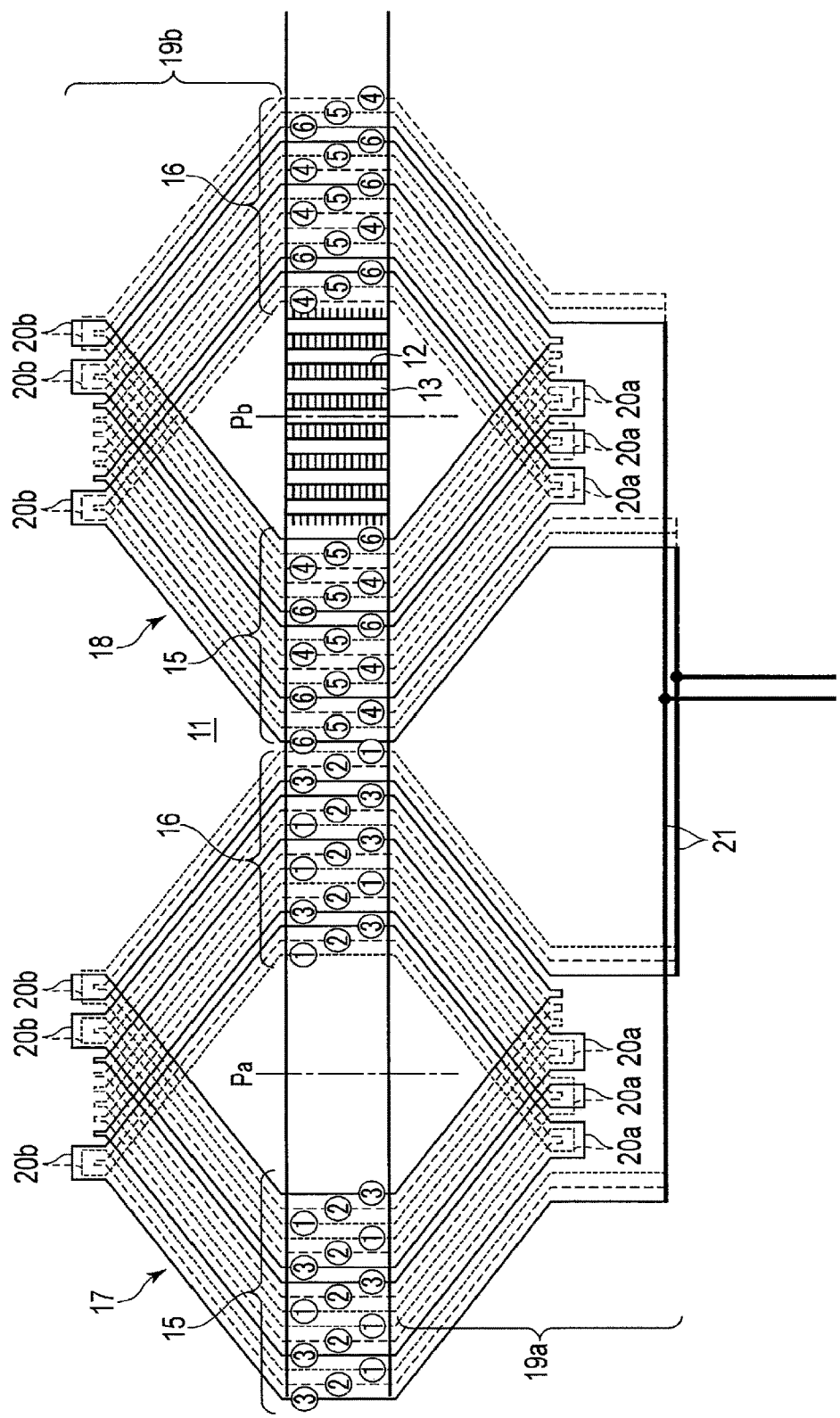
FIG. 11 is a developed perspective view illustrating a part of an armature winding of a rotating electrical machine for two poles/one phase according to an eleventh embodiment.

FIG. 11 is a developed perspective view illustrating a part of an armature winding of a rotating electrical machine for two poles/one phase according to an eleventh embodiment.

As illustrated in FIG. 11, twelve jumper wires 20a per phase are provided in the connection side coil ends 19a of the phase belts 17 and 18, and twelve jumper wires 20b per phase are provided in the counter-connection side coil ends 19b. In addition, in the first phase belt 17, the circuits of the upper coil pieces 15 are numbered "3, 2, 1, 1, 2, 3, 3, 2, 1, 1, 2, 3, 1, 2, 3" sequentially from the pole center, and the circuits of the lower coil pieces 16 are numbered "1, 2, 3, 3, 2, 1, 1, 2, 3, 1, 2, 3, 3, 2, 1" sequentially from the pole center. In the second phase belt 18, the circuits of the upper coil pieces 15 are numbered "6, 5, 4, 4, 5, 6, 6, 5, 4, 4, 5, 6, 4, 5, 6" sequentially from the pole center, and the circuits of the lower coil pieces 16 are numbered "4, 5, 6, 6, 5, 4, 4, 5, 6, 4, 5, 6, 6, 5, 4" sequentially from the pole center.

As a result, when relative positions of the upper and lower coil pieces 15 and 16 in the phase belt are expressed by positions from the pole center, the upper and lower coil pieces 15 and 16 of each parallel circuit are placed as shown in Table 31.

TABLE 31

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | | | 1 | 1 | | | | |
| | Lower coil piece | 1 | | | | | 1 | 1 | |
| Parallel circuits 2, 5 | Upper coil piece | | 1 | | | 1 | | | 1 |
| | Lower coil piece | | 1 | | | 1 | | | 1 |
| Parallel circuits 3, 6 | Upper coil piece | 1 | | | | | 1 | 1 | |
| | Lower coil piece | | | | 1 | 1 | | | |

| Relative positions from pole center | | 9 | 10 | 11 | 12 | 13 | 14 | 15 |
|---|---|---|---|---|---|---|---|---|
| Parallel circuits 1, 4 | Upper coil piece | 1 | 1 | | 1 | | | |
| | Lower coil piece | | 1 | | | | | 1 |
| Parallel circuits 2, 5 | Upper coil piece | | | 1 | | | 1 | |
| | Lower coil piece | | | 1 | | | 1 | |
| Parallel circuits 3, 6 | Upper coil piece | | | | 1 | | | 1 |
| | Lower coil piece | 1 | | | | 1 | 1 | |

As shown in Table 31, for the first and fourth parallel circuits, five upper coil pieces 15 are placed in the 3rd, 4th, 9th, 10th, and 13th positions from the pole center, and five lower coil pieces 16 are placed in the 1st, 6th, 9th, 10th, and 15th positions from the pole center. For each of the second and fifth parallel circuits, five upper and lower coil pieces 15 and 16 are placed in the 2nd, 5th, 8th, 11th, and 14th positions from the pole center. For the third and sixth parallel circuits, five upper coil pieces 15 are placed in the 1st, 6th, 7th, 12th, and 15th positions from the pole center, and five lower coil pieces 16 are placed in the 3rd, 4th, 9th, 12th, and 13th positions from the pole center.

Table 32 shows the degree of balance of the voltage generated from the armature winding according to the eleventh embodiment. Meanwhile, according to the eleventh embodiment, the degree of balance varies depending on a coil pitch. Therefore, in Table 32, the coil pitch is set to "38/45 (84.44%)." As shown in Table 32, in the armature winding according to the eleventh embodiment, a voltage deviation (a deviation of a p.u. voltage from 1.0) is "0.19%" at most, and a phase angle deviation is "0.13°." It is recognized that these values satisfy the requirement of Habermann's patent, in which the voltage deviation be "0.4%" or smaller, and the phase angle deviation be "0.15°" or smaller.

TABLE 32

| Parallel circuit | 1 | 2 | 3 |
|---|---|---|---|
| Voltage [p.u.] | 0.9981 | 1.0016 | 1.0002 |
| Voltage phase [°] | 0.1273 | 0.0000 | −0.1270 |

| Parallel circuit | 4 | 5 | 6 |
|---|---|---|---|
| Voltage [p.u.] | 0.9981 | 1.0016 | 1.0002 |
| Voltage phase [°] | 0.1273 | 0.0000 | −0.1270 |

Table 33 shows a change in the maximum values of the voltage deviation and the phase angle deviation depending on a coil pitch according to the eleventh embodiment. When the coil pitch is within a range of 36/45 to 44/45, the degree of balance satisfies the requirement of Habermann's patent, in which the voltage deviation be "0.4%" or smaller, and the phase angle deviation be "0.15°" or smaller.

TABLE 33

| Coil pitch | 35/45 | 36/45 | 37/45 | 38/45 | 39/45 |
|---|---|---|---|---|---|
| Voltage Deviation[%] | 0.2972 | 0.2415 | 0.1871 | 0.1627 | 0.1627 |
| Phase angle Deviation[°] | 0.1667 | 0.1467 | 0.1273 | 0.1082 | 0.0895 |
| Coil pitch | 40/45 | 41/45 | 42/45 | 43/45 | 44/45 |
| Voltage Deviation[%] | 0.1627 | 0.1842 | 0.2348 | 0.2851 | 0.3351 |
| Phase angle Deviation[°] | 0.0712 | 0.0530 | 0.0351 | 0.0172 | 0.0006 |

As described above, according to the eleventh embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

In the following twelfth embodiment, an exemplary case in which eight jumper wires for one pole and one phase are provided in the connection side coil ends 19a will be described. Although the number of jumper wires in the connection side coil ends 19a increases, a plurality of jumper wires having the same shape can be aligned. Therefore, it is possible to realize a stable connection state.

Twelfth Embodiment

Next, a twelfth embodiment will be described with reference to FIG. 12. Here, the parts common to those of the first embodiment described above (FIG. 1) will not be repeatedly described, and the description will focus on the different parts.

FIG. 12 is a developed perspective view illustrating a part of an armature winding of a rotating electrical machine for two poles/one phase according to a twelfth embodiment.

As illustrated in FIG. 12, sixteen jumper wires 20a per phase are provided in the connection side coil ends 19a of the phase belts 17 and 18, and four jumper wires 20b per phase are provided in the counter-connection side coil ends 19b. In addition, in the first phase belt 17, the circuits of the upper coil pieces 15 are numbered "3, 2, 1, 1, 2, 3, 3, 2, 1, 1, 2, 3, 1, 2, 3" sequentially from the pole center, and the circuits of the lower coil pieces 16 are numbered "1, 2, 3, 3, 2, 1, 1, 2, 3, 3, 2, 1, 1, 2, 3" sequentially from the pole center. In the second phase belt 18, the circuits of the upper coil pieces 15 are numbered "6, 5, 4, 4, 5, 6, 6, 5, 4, 4, 5, 6, 4, 5, 6" sequentially from the pole center, and the circuits of the lower coil pieces 16 are numbered "4, 5, 6, 6, 5, 4, 4, 5, 6, 6, 5, 4, 4, 5, 6" sequentially from the pole center.

As a result, when relative positions of the upper and lower coil pieces 15 and 16 in the phase belt are expressed by positions from the pole center, the upper and lower coil pieces 15 and 16 of each parallel circuit are placed as shown in Table 34.

TABLE 34

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | | | 1 | 1 | | | | |
| | Lower coil piece | 1 | | | | | | 1 | 1 |

TABLE 34-continued

| | | | | | | | |
|---|---|---|---|---|---|---|---|
| Parallel circuits 2, 5 | Upper coil piece | 1 | | 1 | | | 1 |
| | Lower coil piece | 1 | | 1 | | | 1 |
| Parallel circuits 3, 6 | Upper coil piece | 1 | | | | 1 | 1 |
| | Lower coil piece | | 1 | 1 | | | |

| Relative positions from pole center | 9 | 10 | 11 | 12 | 13 | 14 | 15 |
|---|---|---|---|---|---|---|---|
| Parallel circuits 1, 4 | Upper coil piece | 1 | 1 | | | 1 | | |
| | Lower coil piece | | | | 1 | 1 | | |
| Parallel circuits 2, 5 | Upper coil piece | | | | 1 | | | 1 |
| | Lower coil piece | | | | 1 | | | 1 |
| Parallel circuits 3, 6 | Upper coil piece | | | | 1 | | | 1 |
| | Lower coil piece | 1 | 1 | | | | | 1 |

As shown in Table 34, for the first and fourth parallel circuits, five upper coil pieces 15 are placed in the 3rd, 4th, 9th, 10th, and 13th positions from the pole center, and five lower coil pieces 16 are placed in the 1st, 6th, 7th, 12th, and 13th positions from the pole center. For each of the second and fifth parallel circuits, five upper and lower coil pieces 15 and 16 are placed in the 2nd, 5th, 8th, 11th, and 14th positions from the pole center. For the third and sixth parallel circuits, five upper coil pieces 15 are placed in the 1st, 6th, 7th, 12th, and 15th positions from the pole center, and five lower coil pieces 16 are placed in the 3rd, 4th, 9th, 10th, and 15th positions from the pole center.

Table 35 shows the degree of balance of the voltage generated from the armature winding according to the twelfth embodiment. Meanwhile, according to the twelfth embodiment, the degree of balance varies depending on a coil pitch. Therefore, in Table 35, the coil pitch is set to "38/45 (84.44%)." As shown in Table 35, in the armature winding according to the twelfth embodiment, a voltage deviation (a deviation of a p.u. voltage from 1.0) is "0.29%" at most, and a phase angle deviation is "0.13°." It is recognized that these values satisfy the requirement of Habermann's patent, in which the voltage deviation be "0.4%" or smaller, and the phase angle deviation be "0.15°" or smaller.

TABLE 35

| Parallel circuit | 1 | 2 | 3 |
|---|---|---|---|
| Voltage [p.u.] | 1.0013 | 1.0016 | 0.9971 |
| Voltage phase [°] | 0.1332 | 0.0000 | −0.1338 |

| Parallel circuit | 4 | 5 | 6 |
|---|---|---|---|
| Voltage [p.u.] | 1.0013 | 1.0016 | 0.9971 |
| Voltage phase [°] | 0.1332 | 0.0000 | −0.1338 |

Table 36 shows a change in the maximum values of the voltage deviation and the phase angle deviation depending on a coil pitch according to the twelfth embodiment. When the coil pitch is within a range of 36/45 to 39/45 including those not shown in the table, the degree of balance satisfies the requirement of Habermann's patent, in which the voltage deviation be "0.4%" or smaller, and the phase angle deviation be "0.15°" or smaller. In addition, when the coil pitch is within a range of 28/45 to 35/45, the phase angle deviation exceeds "0.15°," which does not satisfy the requirement of Habermann's patent. However, the voltage deviation is within the range of "0.4%." That means the effect of suppressing an eddy current can be anticipated at a certain level.

TABLE 36

| Coil pitch | 27/45 | 28/45 | 29/45 | 30/45 | 33/45 | 34/45 |
|---|---|---|---|---|---|---|
| Voltage Deviation[%] | 0.4555 | 0.3862 | 0.3201 | 0.2568 | 0.1627 | 0.1627 |
| Phase angle Deviation[°] | 0.2844 | 0.2664 | 0.2493 | 0.2329 | 0.1875 | 0.1735 |

| Coil pitch | 35/45 | 36/45 | 37/45 | 38/45 | 39/45 | 40/45 |
|---|---|---|---|---|---|---|
| Voltage Deviation[%] | 0.1894 | 0.2415 | 0.2925 | 0.3425 | 0.3916 | 0.4400 |
| Phase angle Deviation[°] | 0.1600 | 0.1467 | 0.1338 | 0.1211 | 0.1086 | 0.0962 |

As described above, according to the twelfth embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

(Common Features Throughout First to Twelfth Embodiments)

Structural features common to the armature windings throughout the first to twelfth embodiments will be presented below.

There is provided a 3-phase even-numbered-pole 2-layered armature winding housed in 45 slots per pole provided in a laminated iron core of a rotating electrical machine.

Six parallel circuits are provided for each phase of the winding and divided into a pair of phase belts including first and second phase belts 17 and 18, each parallel circuit including upper and lower coil pieces 15 and 16 which are connected to each other in series in a connection side coil end 19a and a counter-connection side coil end 19b.

When relative positions of each of the upper and lower coil pieces 15 and 16 in one phase belt are numbered sequentially from a pole center, each of the upper and lower coil pieces 15 and 16 are classified into five coil piece groups placed in first to third positions, fourth to sixth positions, seventh to ninth position, tenth to twelfth position, and thirteenth to fifteenth positions from the pole center.

Three coil pieces of first, second, and third parallel circuits are arranged in each coil piece group of the first phase belt 17, and three coil pieces of fourth, fifth, and sixth parallel circuits are arranged in each coil piece group of the second phase belt 18.

In each coil piece group of each phase belt, the coil pieces of the second and fifth parallel circuits are placed in the second positions from the pole center among three positions of coil pieces in corresponding coil piece group.

In six or four groups out of ten coil piece groups of each phase belt, coil pieces of the first or fourth parallel circuit are placed in the first position from the pole center.

In first and second coil piece groups placed in the first and second positions from the pole center out of coil piece groups of each phase belt, coil pieces of the first or fourth parallel circuit are placed in different-numbered positions from the pole center.

As described above, according to each embodiment, it is possible to provide an armature winding structure having a number of slots suitable for an indirect cooling type large-capacity rotating electrical machine.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A 3-phase even-numbered-pole 2-layered armature winding housed in 45 slots per pole provided in a laminated iron core of a rotating electrical machine, comprising:
   six parallel circuits provided for each phase of the winding and divided into a pair of phase belts including first and second phase belts, each parallel circuit including upper and lower coil pieces which are connected to each other in series in a connection side coil end and a counter-connection side coil end,
   wherein, when relative positions of each of the upper and lower coil pieces in one phase belt are numbered sequentially from a pole center, each of the upper and lower coil pieces are classified into five coil piece groups placed in first to third positions, fourth to sixth positions, seventh to ninth position, tenth to twelfth position, and thirteenth to fifteenth positions from the pole center,
   three coil pieces of first, second, and third parallel circuits are arranged in each coil piece group of the first phase belt, and three coil pieces of fourth, fifth, and sixth parallel circuits are arranged
   in each coil piece group of the second phase belt, in each coil piece group of each phase belt, the coil pieces of the second and fifth parallel circuits are placed in the second positions from the pole center among three positions of coil pieces in corresponding coil piece group,
   in six or four groups out of ten coil piece groups of each phase belt, coil pieces of the first or fourth parallel circuit are placed in the first position from the pole center among three positions of coil pieces in corresponding coil piece group, and
   in first and second coil piece groups placed in the first and second positions from the pole center out of coil piece groups of each phase belt, coil pieces of the first or fourth parallel circuit are placed in different-numbered positions from the pole center among three positions of coil pieces in corresponding coil piece group to be differently between the first and second coil piece groups.

2. The armature winding of the rotating electrical machine according to claim 1, wherein:
   the upper coil pieces of the first and fourth parallel circuits are placed in the 3rd, 4th, 7th, 10th, and 15th positions from the pole center,
   the lower coil pieces of the first and fourth parallel circuits are placed in the 1st, 6th, 9th, 10th, and 13th positions from the pole center,
   the upper and lower coil pieces of the second and fifth parallel circuits are placed in the 2nd, 5th, 8th, 11th, and 14th positions from the pole center,
   the upper coil pieces of the third and sixth parallel circuits are placed in the 1st, 6th, 9th, 12th, and 13th positions from the pole center, and
   the lower coil pieces of the third and sixth parallel circuits are placed in the 3rd, 4th, 7th, 12th, and 15th positions from the pole center.

3. The armature winding of the rotating electrical machine according to claim 1, wherein:
   the upper coil pieces of the first and fourth parallel circuits are placed in the 3rd, 4th, 7th, 12th, and 15th positions from the pole center,
   the lower coil pieces of the first and fourth parallel circuits are placed in the 1st, 6th, 9th, 12th, and 13th positions from the pole center,
   the upper and lower coil pieces of the second and fifth parallel circuits are placed in the 2nd, 5th, 8th, 11th, and 14th positions from the pole center,
   the upper coil pieces of the third and sixth parallel circuits are placed in the 1st, 6th, 9th, 10th, and 13th positions from the pole center, and
   the lower coil pieces of the third and sixth parallel circuits are placed in the 3rd, 4th, 7th, 10th, and 15th positions from the pole center.

4. The armature winding of the rotating electrical machine according to claim 1, wherein:
   the upper coil pieces of the first and fourth parallel circuits are placed in the 3rd, 4th, 9th, 10th, and 15th positions from the pole center,
   the lower coil pieces of the first and fourth parallel circuits are placed in the 3rd, 4th, 7th, 12th, and 15th positions from the pole center,
   the upper and lower coil pieces of the second and fifth parallel circuits are placed in the 2nd, 5th, 8th, 11th, and 14th positions from the pole center,
   the upper coil pieces of the third and sixth parallel circuits are placed in the 1st, 6th, 7th, 12th, and 13th positions from the pole center, and
   the lower coil pieces of the third and sixth parallel circuits are placed in the 1st, 6th, 9th, 10th, and 13th positions from the pole center.

5. The armature winding of the rotating electrical machine according to claim 1, wherein:
   the upper coil pieces of the first and fourth parallel circuits are placed in the 3rd, 4th, 7th, 12th, and 15th positions from the pole center,
   the lower coil pieces of the first and fourth parallel circuits are placed in the 3rd, 4th, 9th, 10th, and 15th positions from the pole center,
   the upper and lower coil pieces of the second and fifth parallel circuits are placed in the 2nd, 5th, 8th, 11th, and 14th positions from the pole center,
   the upper coil pieces of the third and sixth parallel circuits are placed in the 1st, 6th, 9th, 10th, and 13th positions from the pole center, and
   the lower coil pieces of the third and sixth parallel circuits are placed in the 1st, 6th, 7th, 12th, and 13th positions from the pole center.

6. The armature winding of the rotating electrical machine according to claim 1, wherein:
   the upper coil pieces of the first and fourth parallel circuits are placed in the 3rd, 4th, 9th, 10th, and 15th positions from the pole center,
   the lower coil pieces of the first and fourth parallel circuits are placed in the 1st, 6th, 9th, 10th, and 15th positions from the pole center, the upper and lower coil pieces of the second and fifth parallel circuits are placed in the 2nd, 5th, 8th, 11th, and 14th positions from the pole center, the upper coil pieces of the third and sixth parallel circuits are placed in the 1st, 6th, 7th, 12th, and 13th positions from the pole center, and the lower coil pieces of the third and sixth parallel circuits are placed in the 3rd, 4th, 7th, 12th, and 13th positions from the pole center.

7. The armature winding of the rotating electrical machine according to claim 1, wherein:

the upper coil pieces of the first and fourth parallel circuits are placed in the 3rd, 4th, 7th, 12th, and 15th positions from the pole center, the lower coil pieces of the first and fourth parallel circuits are placed in the 1st, 6th, 9th, 10th, and 15th positions from the pole center, the upper and lower coil pieces of the second and fifth parallel circuits are placed in the 2nd, 5th, 8th, 11th, and 14th positions from the pole center, the upper coil pieces of the third and sixth parallel circuits are placed in the 1st, 6th, 9th, 10th, and 13th positions from the pole center, and the lower coil pieces of the third and sixth parallel circuits are placed in the 3rd, 4th, 7th, 12th, and 13th positions from the pole center.

8. The armature winding of the rotating electrical machine according to claim 1, wherein:

the upper coil pieces of the first and fourth parallel circuits are placed in the 3rd, 4th, 7th, 10th, and 15th positions from the pole center, the lower coil pieces of the first and fourth parallel circuits are placed in the 3rd, 4th, 9th, 10th, and 13th positions from the pole center, the upper and lower coil pieces of the second and fifth parallel circuits are placed in the 2nd, 5th, 8th, 11th, and 14th positions from the pole center, the upper coil pieces of the third and sixth parallel circuits are placed in the 1st, 6th, 9th, 12th, and 13th positions from the pole center, and the lower coil pieces of the third and sixth parallel circuits are placed in the 1st, 6th, 7th, 12th, and 15th positions from the pole center.

9. The armature winding of the rotating electrical machine according to claim 1, wherein:

the upper coil pieces of the first and fourth parallel circuits are placed in the 3rd, 4th, 9th, 10th, and 13th positions from the pole center, the lower coil pieces of the first and fourth parallel circuits are placed in the 3rd, 4th, 7th, 10th, and 15th positions from the pole center, the upper and lower coil pieces of the second and fifth parallel circuits are placed in the 2nd, 5th, 8th, 11th, and 14th positions from the pole center, the upper coil pieces of the third and sixth parallel circuits are placed in the 1st, 6th, 7th, 12th, and 15th positions from the pole center, and the lower coil pieces of the third and sixth parallel circuits are placed in the 1st, 6th, 9th, 12th, and 13th positions from the pole center.

10. The armature winding of the rotating electrical machine according to claim 1, wherein:

the upper coil pieces of the first and fourth parallel circuits are placed in the 3rd, 4th, 7th, 10th, and 15th positions from the pole center, the lower coil pieces of the first and fourth parallel circuits are placed in the 3rd, 4th, 7th, 12th, and 13th positions from the pole center, the upper and lower coil pieces of the second and fifth parallel circuits are placed in the 2nd, 5th, 8th, 11th, and 14th positions from the pole center, the upper coil pieces of the third and sixth parallel circuits are placed in the 1st, 6th, 9th, 12th, and 13th positions from the pole center, and the lower coil pieces of the third and sixth parallel circuits are placed in the 1st, 6th, 9th, 10th, and 15th positions from the pole center.

11. The armature winding of the rotating electrical machine according to claim 1, wherein:

the upper coil pieces of the first and fourth parallel circuits are placed in the 3rd, 4th, 7th, 12th, and 13th positions from the pole center, the lower coil pieces of the first and fourth parallel circuits are placed in the 3rd, 4th, 7th, 10th, and 15th positions from the pole center, the upper and lower coil pieces of the second and fifth parallel circuits are placed in the 2nd, 5th, 8th, 11th, and 14th positions from the pole center, the upper coil pieces of the third and sixth parallel circuits are placed in the 1st, 6th, 9th, 10th, and 15th positions from the pole center, and the lower coil pieces of the third and sixth parallel circuits are placed in the 1st, 6th, 9th, 12th, and 13th positions from the pole center.

12. The armature winding of the rotating electrical machine according to claim 1, wherein:

the upper coil pieces of the first and fourth parallel circuits are placed in the 3rd, 4th, 9th, 10th, and 13th positions from the pole center, the lower coil pieces of the first and fourth parallel circuits are placed in the 1st, 6th, 7th, 10th, and 15th positions from the pole center, the upper and lower coil pieces of the second and fifth parallel circuits are placed in the 2nd, 5th, 8th, 11th, and 14th positions from the pole center, the upper coil pieces of the third and sixth parallel circuits are placed in the 1st, 6th, 7th, 12th, and 15th positions from the pole center, and the lower coil pieces of the third and sixth parallel circuits are placed in the 3rd, 4th, 9th, 12th, and 13th positions from the pole center.

13. The armature winding of the rotating electrical machine according to claim 1, wherein eight jumper wires for one pole and one phase are provided in the connection side coil ends.

14. A rotating electrical machine comprising the armature winding according to claim 1.

* * * * *